(12) United States Patent
Chui et al.

(10) Patent No.: US 9,019,590 B2
(45) Date of Patent: *Apr. 28, 2015

(54) SPATIAL LIGHT MODULATOR WITH INTEGRATED OPTICAL COMPENSATION STRUCTURE

(75) Inventors: Clarence Chui, San Jose, CA (US); Jeffrey B. Sampsell, Pueblo West, CO (US); William J. Cummings, Clinton, WA (US); Ming-Hau Tung, San Francisco, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 13/337,494

(22) Filed: Dec. 27, 2011

(65) Prior Publication Data

US 2012/0099177 A1  Apr. 26, 2012

Related U.S. Application Data

(60) Continuation of application No. 12/014,657, filed on Jan. 15, 2008, now Pat. No. 8,111,445, which is a division of application No. 11/036,965, filed on Jan. 14, 2005, now Pat. No. 7,342,705.
(Continued)

(51) Int. Cl.
*G02B 26/00* (2006.01)
*G02F 1/1335* (2006.01)

(52) U.S. Cl.
CPC ............ *G02B 26/001* (2013.01); *G02F 1/1335* (2013.01); *G02F 2001/13356* (2013.01)

(58) Field of Classification Search
CPC ................ G02B 26/001; G02F 1/1335; G02F 2001/13356
USPC .................. 359/209–292, 298, 308, 318, 578; 356/454; 345/85
See application file for complete search history.

(56) References Cited

U.S. PATENT DOCUMENTS 2,518,647 A  8/1950  Teeple et al.
2,534,846 A  12/1950  Ambrose et al.
(Continued)

FOREIGN PATENT DOCUMENTS

CA  2 490 975  1/2004
CN  1158182  8/1997
(Continued)

OTHER PUBLICATIONS

Austrian Search Report for U.S. Appl. No. 11/036,965 dated Jul. 25, 2005.
(Continued)

*Primary Examiner* — Tuyen Tra
(74) *Attorney, Agent, or Firm* — Knobbe Martens Olson & Bear LLP

(57) ABSTRACT

A spatial light modulator comprises an integrated optical compensation structure, e.g., an optical compensation structure arranged between a substrate and a plurality of individually addressable light-modulating elements, or an optical compensation structure located on the opposite side of the light-modulating elements from the substrate. The individually addressable light-modulating elements are configured to modulate light transmitted through or reflected from the transparent substrate. Methods for making such spatial light modulators involve fabricating an optical compensation structure over a substrate and fabricating a plurality of individually addressable light-modulating elements over the optical compensation structure. The optical compensation structure may be a passive optical compensation structure. The optical compensation structure may include one or more of a supplemental frontlighting source, a diffuser, a black mask, a diffractive optical element, a color filter, an anti-reflective layer, a structure that scatters light, a microlens array, and a holographic film.

22 Claims, 5 Drawing Sheets

Related U.S. Application Data

(60) Provisional application No. 60/541,607, filed on Feb. 3, 2004, provisional application No. 60/613,482, filed on Sep. 27, 2004, provisional application No. 60/613,536, filed on Sep. 27, 2004, provisional application No. 60/613,542, filed on Sep. 27, 2004.

(56) References Cited

U.S. PATENT DOCUMENTS

| | | |
|---|---|---|
| 2,677,714 A | 5/1954 | Auwarter |
| 3,247,392 A | 4/1966 | Thelen |
| 3,439,973 A | 4/1969 | Bernt et al. |
| 3,443,854 A | 5/1969 | Weiss |
| 3,448,334 A | 6/1969 | Frost |
| 3,653,741 A | 4/1972 | Marks |
| 3,656,836 A | 4/1972 | de Cremoux et al. |
| 3,679,313 A | 7/1972 | Rosenberg |
| 3,725,868 A | 4/1973 | Malmer et al. |
| 3,813,265 A | 5/1974 | Marks |
| 3,886,310 A | 5/1975 | Guldberg et al. |
| 3,924,929 A | 12/1975 | Holmen et al. |
| 3,955,880 A | 5/1976 | Lierke |
| 4,099,854 A | 7/1978 | Decker et al. |
| 4,200,472 A | 4/1980 | Chappell et al. |
| 4,228,437 A | 10/1980 | Shelton |
| 4,287,449 A | 9/1981 | Takeda et al. |
| 4,375,312 A | 3/1983 | Tangonan |
| 4,377,324 A | 3/1983 | Durand |
| 4,378,567 A | 3/1983 | Mir |
| 4,389,096 A | 6/1983 | Hori et al. |
| 4,400,577 A | 8/1983 | Spear |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | Te Velde |
| 4,519,676 A | 5/1985 | Te Velde |
| 4,531,126 A | 7/1985 | Sadones |
| 4,633,031 A | 12/1986 | Todorof |
| 4,663,083 A | 5/1987 | Marks |
| 4,681,403 A | 7/1987 | Te Velde et al. |
| 4,681,406 A | 7/1987 | Naito et al. |
| 4,748,366 A | 5/1988 | Taylor |
| 4,786,128 A | 11/1988 | Birnbach |
| 4,790,635 A | 12/1988 | Apsley |
| 4,832,459 A | 5/1989 | Harper et al. |
| 4,850,682 A | 7/1989 | Gerritsen |
| 4,859,060 A | 8/1989 | Katagiri et al. |
| 4,863,224 A | 9/1989 | Afian et al. |
| 4,878,741 A | 11/1989 | Fergason |
| 4,915,479 A | 4/1990 | Clarke |
| 4,918,577 A | 4/1990 | Furudate |
| 4,947,291 A | 8/1990 | McDermott |
| 4,961,617 A | 10/1990 | Shahidi et al. |
| 4,974,942 A | 12/1990 | Gross et al. |
| 4,980,775 A | 12/1990 | Brody |
| 4,982,184 A | 1/1991 | Kirkwood |
| 5,022,745 A | 6/1991 | Zayhowski et al. |
| 5,037,173 A | 8/1991 | Sampsell et al. |
| 5,038,224 A | 8/1991 | Martulli et al. |
| 5,042,921 A | 8/1991 | Sato et al. |
| 5,044,736 A | 9/1991 | Jaskie et al. |
| 5,050,946 A | 9/1991 | Hathaway et al. |
| 5,075,796 A | 12/1991 | Schildkraut et al. |
| 5,110,370 A | 5/1992 | Vogeli et al. |
| 5,124,834 A | 6/1992 | Cusano et al. |
| 5,142,414 A | 8/1992 | Koehler |
| 5,151,585 A | 9/1992 | Siebert |
| 5,151,801 A | 9/1992 | Hiroshima |
| 5,153,771 A | 10/1992 | Link et al. |
| 5,164,858 A | 11/1992 | Aguilera, Jr. et al. |
| 5,168,406 A | 12/1992 | Nelson |
| 5,192,946 A | 3/1993 | Thompson et al. |
| 5,206,747 A | 4/1993 | Wiley et al. |
| 5,221,982 A | 6/1993 | Faris |
| 5,226,099 A | 7/1993 | Mignardi et al. |
| 5,231,532 A | 7/1993 | Magel et al. |
| 5,233,385 A | 8/1993 | Sampsell |
| 5,261,970 A | 11/1993 | Landis et al. |
| 5,272,496 A | 12/1993 | Nicolas et al. |
| 5,278,680 A | 1/1994 | Karasawa et al. |
| 5,283,600 A | 2/1994 | Imai |
| 5,287,215 A | 2/1994 | Warde et al. |
| 5,289,300 A | 2/1994 | Yamazaki |
| 5,291,314 A | 3/1994 | Agranat et al. |
| 5,293,272 A | 3/1994 | Jannson et al. |
| 5,311,360 A | 5/1994 | Bloom et al. |
| 5,326,426 A | 7/1994 | Tam et al. |
| 5,327,263 A | 7/1994 | Katagiri et al. |
| 5,339,179 A | 8/1994 | Rudisill et al. |
| 5,341,242 A | 8/1994 | Gilboa et al. |
| 5,345,322 A | 9/1994 | Fergason |
| 5,356,488 A | 10/1994 | Hezel |
| 5,361,190 A | 11/1994 | Roberts et al. |
| 5,365,283 A | 11/1994 | Doherty et al. |
| 5,381,253 A | 1/1995 | Sharp et al. |
| 5,387,953 A | 2/1995 | Minoura et al. |
| 5,387,991 A | 2/1995 | Mitsutake et al. |
| 5,398,125 A | 3/1995 | Willett et al. |
| 5,398,170 A | 3/1995 | Lee |
| 5,401,983 A | 3/1995 | Jokerst et al. |
| 5,418,631 A | 5/1995 | Tedesco |
| 5,446,510 A | 8/1995 | Mitsutake et al. |
| 5,448,314 A | 9/1995 | Heimbuch et al. |
| 5,448,659 A | 9/1995 | Tsutsui et al. |
| 5,452,385 A | 9/1995 | Izumi et al. |
| 5,459,610 A | 10/1995 | Bloom et al. |
| 5,467,417 A | 11/1995 | Nakamura et al. |
| 5,474,865 A | 12/1995 | Vasudev |
| 5,481,385 A | 1/1996 | Zimmerman et al. |
| 5,497,172 A | 3/1996 | Doherty et al. |
| 5,500,635 A | 3/1996 | Mott |
| 5,500,761 A | 3/1996 | Goosen et al. |
| 5,515,184 A | 5/1996 | Caulfield et al. |
| 5,517,347 A | 5/1996 | Sampsell |
| 5,517,366 A | 5/1996 | Togino |
| 5,550,373 A | 8/1996 | Cole et al. |
| 5,555,160 A | 9/1996 | Tawara et al. |
| 5,555,186 A | 9/1996 | Shioya |
| 5,579,149 A | 11/1996 | Moret et al. |
| 5,592,332 A | 1/1997 | Nishio et al. |
| 5,594,830 A | 1/1997 | Winston et al. |
| 5,601,351 A | 2/1997 | Van Den Brandt |
| 5,604,607 A | 2/1997 | Mirzaoff |
| 5,606,441 A | 2/1997 | Florence et al. |
| 5,615,024 A | 3/1997 | May et al. |
| 5,619,059 A | 4/1997 | Li et al. |
| 5,619,365 A | 4/1997 | Rhoads et al. |
| 5,619,366 A | 4/1997 | Rhoads et al. |
| 5,626,408 A | 5/1997 | Heynderickx et al. |
| 5,633,739 A | 5/1997 | Matsuyama et al. |
| 5,636,052 A | 6/1997 | Arney et al. |
| 5,638,084 A | 6/1997 | Kalt |
| 5,647,036 A | 7/1997 | Deacon et al. |
| 5,650,865 A | 7/1997 | Smith |
| 5,659,410 A | 8/1997 | Koike et al. |
| 5,671,314 A | 9/1997 | Gregory et al. |
| 5,671,994 A | 9/1997 | Tai et al. |
| 5,673,128 A | 9/1997 | Ohta et al. |
| 5,703,667 A | 12/1997 | Ochiai |
| 5,703,710 A | 12/1997 | Brinkman et al. |
| 5,706,134 A | 1/1998 | Konno et al. |
| 5,710,656 A | 1/1998 | Goossen |
| 5,712,694 A | 1/1998 | Taira et al. |
| 5,731,857 A | 3/1998 | Neijzen |
| 5,735,590 A | 4/1998 | Kashima et al. |
| 5,739,945 A | 4/1998 | Tayebati |
| 5,745,281 A | 4/1998 | Yi |
| 5,749,642 A | 5/1998 | Kimura et al. |
| 5,751,492 A | 5/1998 | Meyers |
| 5,754,260 A | 5/1998 | Ooi et al. |
| 5,771,124 A | 6/1998 | Kintz et al. |
| 5,771,321 A | 6/1998 | Stern |

(56) References Cited

U.S. PATENT DOCUMENTS

| | | |
|---|---|---|
| 5,772,299 A | 6/1998 | Koo et al. |
| 5,782,993 A | 7/1998 | Ponewash |
| 5,782,995 A | 7/1998 | Nanya et al. |
| 5,783,614 A | 7/1998 | Chen et al. |
| 5,805,117 A | 9/1998 | Mazurek |
| 5,808,708 A | 9/1998 | Oyama et al. |
| 5,810,464 A | 9/1998 | Ishikawa et al. |
| 5,815,229 A | 9/1998 | Shapiro |
| 5,816,677 A | 10/1998 | Kurematsu et al. |
| 5,818,095 A | 10/1998 | Sampsell |
| 5,835,255 A | 11/1998 | Miles |
| 5,835,256 A | 11/1998 | Huibers |
| 5,845,035 A | 12/1998 | Wimberger-Friedl |
| 5,853,240 A | 12/1998 | Tanaka et al. |
| 5,853,310 A | 12/1998 | Nishimura et al. |
| 5,854,872 A | 12/1998 | Tai |
| 5,868,480 A | 2/1999 | Zeinali |
| 5,877,874 A | 3/1999 | Rosenberg |
| 5,883,684 A | 3/1999 | Millikan et al. |
| 5,886,688 A | 3/1999 | Fifield et al. |
| 5,892,598 A | 4/1999 | Asakawa et al. |
| 5,894,359 A | 4/1999 | Suzuki et al. |
| 5,895,851 A | 4/1999 | Kano et al. |
| 5,913,594 A | 6/1999 | Iimura |
| 5,914,804 A | 6/1999 | Goossen |
| 5,920,417 A | 7/1999 | Johnson |
| 5,933,183 A | 8/1999 | Enomoto |
| 5,956,106 A | 9/1999 | Petersen et al. |
| 5,959,763 A | 9/1999 | Bozler et al. |
| 5,975,703 A | 11/1999 | Holman et al. |
| 5,982,540 A | 11/1999 | Koike et al. |
| 5,986,796 A | 11/1999 | Miles |
| 5,991,073 A | 11/1999 | Woodgate et al. |
| 5,999,239 A | 12/1999 | Larson |
| 6,002,829 A | 12/1999 | Winston et al. |
| 6,008,449 A | 12/1999 | Cole |
| 6,014,192 A | 1/2000 | Lehureau et al. |
| 6,023,373 A | 2/2000 | Inoguchi et al. |
| 6,028,649 A | 2/2000 | Faris et al. |
| 6,028,690 A | 2/2000 | Carter et al. |
| 6,031,653 A | 2/2000 | Wang |
| 6,040,937 A | 3/2000 | Miles |
| 6,046,840 A | 4/2000 | Huibers |
| 6,048,071 A | 4/2000 | Sawayama |
| 6,049,317 A | 4/2000 | Thompson et al. |
| 6,055,090 A | 4/2000 | Miles |
| 6,072,620 A | 6/2000 | Shiono et al. |
| 6,073,034 A | 6/2000 | Jacobsen et al. |
| 6,074,069 A | 6/2000 | Chao-Ching et al. |
| 6,088,102 A | 7/2000 | Manhart |
| 6,088,941 A | 7/2000 | Inbar et al. |
| 6,091,469 A | 7/2000 | Naito |
| 6,094,285 A | 7/2000 | Wickham et al. |
| 6,099,134 A | 8/2000 | Taniguchi et al. |
| 6,100,952 A | 8/2000 | Marvin et al. |
| 6,113,239 A | 9/2000 | Sampsell et al. |
| 6,128,077 A | 10/2000 | Jovin et al. |
| 6,147,728 A | 11/2000 | Okumura et al. |
| 6,151,089 A | 11/2000 | Yang et al. |
| 6,166,834 A | 12/2000 | Taketomi et al. |
| 6,167,761 B1 | 1/2001 | Hanzawa et al. |
| 6,195,196 B1 | 2/2001 | Kimura |
| 6,196,691 B1 | 3/2001 | Ochiai |
| 6,199,989 B1 | 3/2001 | Maeda et al. |
| 6,201,633 B1 | 3/2001 | Peeters et al. |
| 6,208,466 B1 | 3/2001 | Liu et al. |
| 6,211,976 B1 | 4/2001 | Popovich et al. |
| 6,213,606 B1 | 4/2001 | Holman et al. |
| 6,232,937 B1 | 5/2001 | Jacobsen et al. |
| 6,243,149 B1 | 6/2001 | Swanson et al. |
| 6,259,082 B1 | 7/2001 | Fujimoto et al. |
| 6,273,577 B1 | 8/2001 | Goto et al. |
| 6,282,010 B1 | 8/2001 | Sulzbach |
| 6,283,602 B1 | 9/2001 | Kawaguchi et al. |
| 6,285,424 B1 | 9/2001 | Yoshida |
| 6,288,824 B1 | 9/2001 | Kastalsky |
| 6,292,504 B1 | 9/2001 | Halmos |
| 6,300,558 B1 | 10/2001 | Takamoto et al. |
| 6,301,000 B1 | 10/2001 | Johnson |
| 6,301,026 B1 | 10/2001 | Ueda |
| 6,322,236 B1 | 11/2001 | Campbell et al. |
| 6,323,415 B1 | 11/2001 | Uematsu et al. |
| 6,323,892 B1 | 11/2001 | Mihara |
| 6,323,923 B1 | 11/2001 | Hoshino et al. |
| 6,323,987 B1 | 11/2001 | Rinaudo et al. |
| 6,342,970 B1 | 1/2002 | Sperger et al. |
| 6,356,378 B1 | 3/2002 | Huibers |
| 6,359,668 B1 | 3/2002 | Iijima et al. |
| 6,368,885 B1 | 4/2002 | Offenberg et al. |
| 6,371,623 B1 | 4/2002 | Toyoda |
| 6,375,327 B2 | 4/2002 | Holman et al. |
| 6,377,233 B2 | 4/2002 | Colgan et al. |
| 6,377,535 B1 | 4/2002 | Chen et al. |
| 6,381,022 B1 | 4/2002 | Zavracky |
| 6,399,257 B1 | 6/2002 | Shirota et al. |
| 6,400,738 B1 | 6/2002 | Tucker et al. |
| 6,402,325 B1 | 6/2002 | Yamamoto |
| 6,407,785 B1 | 6/2002 | Yamazaki |
| 6,411,423 B2 | 6/2002 | Ham |
| 6,412,969 B1 | 7/2002 | Torihara et al. |
| 6,421,103 B2 | 7/2002 | Yamaguchi |
| 6,431,716 B1 | 8/2002 | Kusakabe |
| 6,442,124 B1 | 8/2002 | Chung et al. |
| 6,448,709 B1 | 9/2002 | Chuang |
| 6,454,452 B1 | 9/2002 | Sasagawa et al. |
| 6,456,279 B1 | 9/2002 | Kubo et al. |
| 6,466,354 B1 | 10/2002 | Gudeman |
| 6,466,358 B2 | 10/2002 | Tew |
| 6,470,115 B1 | 10/2002 | Yonekubo |
| 6,478,432 B1 | 11/2002 | Dyner |
| 6,480,634 B1 | 11/2002 | Corrigan |
| 6,483,613 B1 | 11/2002 | Woodgate et al. |
| 6,493,475 B1 | 12/2002 | Lin |
| 6,494,588 B1 | 12/2002 | Okada |
| 6,504,589 B1 | 1/2003 | Kashima et al. |
| 6,512,626 B1 | 1/2003 | Schmidt |
| 6,518,944 B1 | 2/2003 | Doane et al. |
| 6,519,073 B1 | 2/2003 | Goossen |
| 6,520,643 B1 | 2/2003 | Holman et al. |
| 6,522,373 B1 | 2/2003 | Hira et al. |
| 6,522,792 B1 | 2/2003 | Sugamata et al. |
| 6,522,794 B1 | 2/2003 | Bischel et al. |
| 6,527,410 B2 | 3/2003 | Yamaguchi |
| 6,538,813 B1 | 3/2003 | Magno et al. |
| 6,540,368 B2 | 4/2003 | Akaoka |
| 6,545,734 B2 | 4/2003 | Cornelissen et al. |
| 6,549,338 B1 | 4/2003 | Wolverton et al. |
| 6,561,661 B2 | 5/2003 | Egawa |
| 6,565,225 B2 | 5/2003 | Mabuchi et al. |
| 6,570,681 B1 | 5/2003 | Favalora et al. |
| 6,574,033 B1 | 6/2003 | Chui |
| 6,577,429 B1 | 6/2003 | Kurtz et al. |
| 6,580,496 B2 | 6/2003 | Bamji et al. |
| 6,582,095 B1 | 6/2003 | Toyoda |
| 6,592,234 B2 | 7/2003 | Epstein et al. |
| 6,597,419 B1 | 7/2003 | Okada et al. |
| 6,597,490 B2 | 7/2003 | Tayebati |
| 6,598,987 B1 | 7/2003 | Parikka |
| 6,603,520 B2 | 8/2003 | Umemoto et al. |
| 6,624,944 B1 | 9/2003 | Wallace et al. |
| 6,630,786 B2 | 10/2003 | Cummings et al. |
| 6,630,968 B1 | 10/2003 | Tsuchihashi et al. |
| 6,631,998 B2 | 10/2003 | Egawa et al. |
| 6,636,283 B2 | 10/2003 | Sasagawa et al. |
| 6,636,322 B1 | 10/2003 | Terashita |
| 6,636,358 B2 | 10/2003 | Umemoto et al. |
| 6,636,653 B2 | 10/2003 | Miracky et al. |
| 6,642,913 B1 | 11/2003 | Kimura |
| 6,642,976 B2 | 11/2003 | Umemoto et al. |
| 6,643,067 B2 | 11/2003 | Miyamae et al. |
| 6,643,069 B2 | 11/2003 | Dewald |
| 6,646,772 B1 | 11/2003 | Popovich et al. |
| 6,650,455 B2 | 11/2003 | Miles |
| 6,652,109 B2 | 11/2003 | Nakamura |

(56) References Cited

U.S. PATENT DOCUMENTS

| | | |
|---|---|---|
| 6,655,820 B2 | 12/2003 | Jung et al. |
| 6,657,683 B2 | 12/2003 | Richard |
| 6,657,700 B2 | 12/2003 | Sako et al. |
| 6,659,615 B2 | 12/2003 | Umemoto |
| 6,660,997 B2 | 12/2003 | Laberge et al. |
| 6,665,029 B2 | 12/2003 | Kondo et al. |
| 6,667,782 B1 | 12/2003 | Taira et al. |
| 6,669,350 B2 | 12/2003 | Yamashita et al. |
| 6,674,562 B1 | 1/2004 | Miles |
| 6,677,709 B1 | 1/2004 | Ma et al. |
| 6,680,792 B2 | 1/2004 | Miles |
| 6,683,693 B1 | 1/2004 | O Tsuka et al. |
| 6,687,040 B2 | 2/2004 | Kimura |
| 6,693,690 B2 | 2/2004 | Umemoto et al. |
| 6,696,140 B2 | 2/2004 | Suzuki |
| 6,706,339 B1 | 3/2004 | Miyatake et al. |
| 6,709,123 B2 | 3/2004 | Flohr et al. |
| 6,738,194 B1 | 5/2004 | Ramirez et al. |
| 6,741,377 B2 | 5/2004 | Miles |
| 6,742,907 B2 | 6/2004 | Funamoto et al. |
| 6,742,921 B2 | 6/2004 | Umemoto et al. |
| 6,747,801 B2 | 6/2004 | Umemoto et al. |
| 6,751,023 B2 | 6/2004 | Umemoto et al. |
| 6,760,135 B1 | 7/2004 | Payne et al. |
| 6,760,146 B2 | 7/2004 | Ikeda et al. |
| 6,761,461 B2 | 7/2004 | Mizutani et al. |
| 6,768,555 B2 | 7/2004 | Chen et al. |
| 6,773,126 B1 | 8/2004 | Hatjasalo et al. |
| 6,774,962 B2 | 8/2004 | Yoon |
| 6,778,746 B2 | 8/2004 | Charlton et al. |
| 6,784,948 B2 | 8/2004 | Kawashima et al. |
| 6,792,293 B1 | 9/2004 | Awan et al. |
| 6,794,119 B2 | 9/2004 | Miles |
| 6,806,924 B2 | 10/2004 | Niiyama et al. |
| 6,811,267 B1 | 11/2004 | Allen et al. |
| 6,819,380 B2 | 11/2004 | Wen et al. |
| 6,822,745 B2 | 11/2004 | De Groot et al. |
| 6,822,780 B1 | 11/2004 | Long, Jr. |
| 6,825,895 B2 | 11/2004 | Nakano et al. |
| 6,826,000 B2 | 11/2004 | Lee et al. |
| 6,829,258 B1 | 12/2004 | Carlisle et al. |
| 6,841,787 B2 | 1/2005 | Almogy |
| 6,844,953 B2 | 1/2005 | Reboa |
| 6,844,959 B2 | 1/2005 | Huibers et al. |
| 6,852,396 B1 | 2/2005 | Mineo |
| 6,853,418 B2 | 2/2005 | Suzuki et al. |
| 6,861,121 B2 | 3/2005 | Matsunaga et al. |
| 6,862,141 B2 | 3/2005 | Olczak |
| 6,863,428 B2 | 3/2005 | Lundin |
| 6,865,312 B2 | 3/2005 | Niv et al. |
| 6,866,393 B2 | 3/2005 | Yano et al. |
| 6,867,896 B2 | 3/2005 | Miles |
| 6,870,581 B2 | 3/2005 | Li et al. |
| 6,871,982 B2 | 3/2005 | Holman et al. |
| 6,879,354 B1 | 4/2005 | Sawayama et al. |
| 6,880,959 B2 | 4/2005 | Houston |
| 6,882,421 B2 | 4/2005 | Opsal et al. |
| 6,882,458 B2 | 4/2005 | Lin et al. |
| 6,882,461 B1 | 4/2005 | Tsai |
| 6,883,924 B2 | 4/2005 | Maeda et al. |
| 6,883,934 B2 | 4/2005 | Kawakami et al. |
| 6,885,377 B2 | 4/2005 | Lim et al. |
| 6,891,530 B2 | 5/2005 | Umemoto et al. |
| 6,897,855 B1 | 5/2005 | Matthies et al. |
| 6,897,923 B2 | 5/2005 | Kanesaka et al. |
| 6,912,022 B2 | 6/2005 | Lin |
| 6,917,469 B2 | 7/2005 | Momose et al. |
| 6,930,816 B2 | 8/2005 | Mochizuki |
| 6,951,401 B2 | 10/2005 | Van Hees et al. |
| 6,960,010 B2 | 11/2005 | Matsumoto et al. |
| 6,961,045 B2 | 11/2005 | Tsao |
| 6,964,484 B2 | 11/2005 | Gupta et al. |
| 6,967,779 B2 | 11/2005 | Fadel et al. |
| 6,970,031 B1 | 11/2005 | Martin et al. |
| 6,972,827 B2 | 12/2005 | Mi |
| 6,982,820 B2 | 1/2006 | Tsai |
| 6,995,890 B2 | 2/2006 | Lin |
| 6,998,196 B2 | 2/2006 | Rich et al. |
| 6,999,225 B2 | 2/2006 | Lin et al. |
| 6,999,235 B2 | 2/2006 | Nakamura |
| 6,999,236 B2 | 2/2006 | Lin et al. |
| 7,002,726 B2 | 2/2006 | Patel |
| 7,004,610 B2 | 2/2006 | Yamashita et al. |
| 7,006,272 B2 | 2/2006 | Tsai |
| 7,009,754 B2 | 3/2006 | Huibers |
| 7,010,212 B2 | 3/2006 | Emmons et al. |
| 7,012,659 B2 | 3/2006 | Smith et al. |
| 7,016,095 B2 | 3/2006 | Lin |
| 7,018,088 B2 | 3/2006 | Yu et al. |
| 7,019,734 B2 | 3/2006 | Cross et al. |
| 7,025,461 B2 | 4/2006 | Veligdan et al. |
| 7,030,949 B2 | 4/2006 | Kashima |
| 7,034,981 B2 | 4/2006 | Makigaki |
| 7,038,752 B2 | 5/2006 | Lin |
| 7,041,344 B2 | 5/2006 | Kusume et al. |
| 7,042,444 B2 | 5/2006 | Cok |
| 7,042,643 B2 | 5/2006 | Miles |
| 7,046,409 B2 | 5/2006 | Kihara |
| 7,050,219 B2 | 5/2006 | Kimura |
| 7,054,045 B2 | 5/2006 | McPheters et al. |
| 7,056,001 B2 | 6/2006 | Chuang |
| 7,061,226 B2 | 6/2006 | Durr |
| 7,064,875 B2 | 6/2006 | Kawano et al. |
| 7,068,948 B2 | 6/2006 | Wei et al. |
| 7,072,093 B2 | 7/2006 | Piehl et al. |
| 7,072,096 B2 | 7/2006 | Holman et al. |
| 7,092,163 B2 | 8/2006 | Bastawros et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,126,738 B2 | 10/2006 | Miles |
| 7,128,459 B2 | 10/2006 | Igarashi et al. |
| 7,130,104 B2 | 10/2006 | Cummings |
| 7,133,022 B2 | 11/2006 | Grabert |
| 7,136,213 B2 | 11/2006 | Chui |
| 7,138,984 B1 | 11/2006 | Miles |
| 7,142,346 B2 | 11/2006 | Chui et al. |
| 7,142,347 B2 | 11/2006 | Islam |
| 7,156,546 B2 | 1/2007 | Higashiyama |
| 7,161,136 B1 | 1/2007 | Wenstrand et al. |
| 7,161,728 B2 | 1/2007 | Sampsell et al. |
| 7,161,730 B2 | 1/2007 | Floyd |
| 7,172,915 B2 | 2/2007 | Lin et al. |
| 7,180,672 B2 | 2/2007 | Olczak |
| 7,187,489 B2 | 3/2007 | Miles |
| 7,206,133 B2 | 4/2007 | Cassarly et al. |
| 7,210,806 B2 | 5/2007 | Holman et al. |
| 7,212,345 B2 | 5/2007 | Wilson |
| 7,218,429 B2 | 5/2007 | Batchko |
| 7,218,812 B2 | 5/2007 | Maxwell et al. |
| 7,221,418 B2 | 5/2007 | Lee et al. |
| 7,223,010 B2 | 5/2007 | Min et al. |
| 7,236,663 B2 | 6/2007 | Wakita et al. |
| 7,256,922 B2 | 8/2007 | Chui et al. |
| 7,262,754 B1 | 8/2007 | Yamazaki |
| 7,262,916 B2 | 8/2007 | Kao et al. |
| 7,264,389 B2 | 9/2007 | Sado et al. |
| 7,304,784 B2 | 12/2007 | Chui et al. |
| 7,324,248 B2 | 1/2008 | Brotherton-Ratcliffe et al. |
| 7,324,284 B2 | 1/2008 | Olczak |
| 7,327,510 B2 | 2/2008 | Cummings et al. |
| 7,335,780 B2 | 2/2008 | Annis |
| 7,336,329 B2 | 2/2008 | Yoon |
| 7,342,705 B2 | 3/2008 | Chui et al. |
| 7,342,709 B2 | 3/2008 | Lin |
| 7,349,139 B2 | 3/2008 | Chui et al. |
| 7,349,141 B2 | 3/2008 | Tung et al. |
| 7,352,501 B2 | 4/2008 | Chopra et al. |
| 7,352,940 B2 | 4/2008 | Charters et al. |
| 7,355,780 B2 | 4/2008 | Chui et al. |
| 7,357,552 B2 | 4/2008 | Takada |
| 7,357,557 B2 | 4/2008 | Miyashita |
| 7,359,011 B2 | 4/2008 | Hamada et al. |

(56) References Cited

U.S. PATENT DOCUMENTS

| | | |
|---|---|---|
| 7,360,899 B2 | 4/2008 | McGuire, Jr. et al. |
| 7,366,393 B2 | 4/2008 | Cassarly et al. |
| 7,369,292 B2 | 5/2008 | Xu et al. |
| 7,369,294 B2 | 5/2008 | Gally et al. |
| 7,372,449 B2 | 5/2008 | Kodama et al. |
| 7,372,631 B2 | 5/2008 | Ozawa |
| 7,374,327 B2 | 5/2008 | Schexnaider |
| 7,375,779 B2 | 5/2008 | Lee et al. |
| 7,376,308 B2 | 5/2008 | Cheben et al. |
| 7,377,678 B2 | 5/2008 | Huang et al. |
| 7,380,969 B2 | 6/2008 | Yamashita et al. |
| 7,380,970 B2 | 6/2008 | Hwang et al. |
| 7,385,748 B2 | 6/2008 | Miles |
| 7,388,181 B2 | 6/2008 | Han et al. |
| 7,388,706 B2 | 6/2008 | Miles |
| 7,389,476 B2 | 6/2008 | Senda et al. |
| 7,400,439 B2 | 7/2008 | Holman |
| 7,403,180 B1 | 7/2008 | Silverstein et al. |
| 7,417,735 B2 | 8/2008 | Cummings et al. |
| 7,417,784 B2 | 8/2008 | Sasagawa et al. |
| 7,420,638 B2 | 9/2008 | Tasaka et al. |
| 7,420,725 B2 | 9/2008 | Kothari |
| 7,450,295 B2 | 11/2008 | Tung et al. |
| 7,456,805 B2 | 11/2008 | Ouderkirk et al. |
| 7,463,421 B2 | 12/2008 | Miles |
| 7,477,809 B1 | 1/2009 | Tan et al. |
| 7,494,830 B2 | 2/2009 | Liu et al. |
| 7,498,621 B2 | 3/2009 | Seitz |
| 7,502,081 B2 | 3/2009 | Umemoto et al. |
| 7,508,571 B2 | 3/2009 | Gally et al. |
| 7,515,336 B2 | 4/2009 | Lippey et al. |
| 7,520,642 B2 | 4/2009 | Holman et al. |
| 7,532,800 B2 | 5/2009 | Iimura |
| 7,545,569 B2 | 6/2009 | Cassarly |
| 7,557,935 B2 | 7/2009 | Baruch |
| 7,561,323 B2 | 7/2009 | Gally et al. |
| 7,564,612 B2 | 7/2009 | Chui |
| 7,603,001 B2 | 10/2009 | Wang et al. |
| 7,630,114 B2 | 12/2009 | Wang et al. |
| 7,630,123 B2 | 12/2009 | Kothari |
| 7,643,203 B2 | 1/2010 | Gousev et al. |
| 7,663,714 B2 | 2/2010 | Haga et al. |
| 7,684,126 B2 | 3/2010 | Eckhardt |
| 7,688,494 B2 | 3/2010 | Xu et al. |
| 7,692,844 B2 | 4/2010 | Miles |
| 7,701,029 B2 | 4/2010 | Mabuchi |
| 7,706,050 B2 | 4/2010 | Sampsell |
| 7,710,632 B2 | 5/2010 | Cummings |
| 7,710,636 B2 | 5/2010 | Chui |
| 7,719,500 B2 | 5/2010 | Chui |
| 7,719,747 B2 | 5/2010 | Tung et al. |
| 7,733,439 B2 | 6/2010 | Sampsell et al. |
| 7,750,886 B2 | 7/2010 | Sampsell |
| 7,766,498 B2 | 8/2010 | Sampsell |
| 7,766,531 B2 | 8/2010 | Anderson et al. |
| 7,768,690 B2 | 8/2010 | Sampsell |
| 7,777,954 B2 | 8/2010 | Gruhike et al. |
| 7,807,488 B2 | 10/2010 | Gally et al. |
| 7,813,026 B2 | 10/2010 | Sampsell |
| 7,813,029 B2 | 10/2010 | Kothari et al. |
| 7,843,061 B2 | 11/2010 | Poli et al. |
| 7,845,841 B2 | 12/2010 | Sampsell |
| 7,848,001 B2 | 12/2010 | Miles |
| 7,855,824 B2 | 12/2010 | Gally |
| 7,855,827 B2 | 12/2010 | Xu et al. |
| 7,864,395 B2 | 1/2011 | Chui |
| 7,872,394 B1 | 1/2011 | Gritters et al. |
| 7,876,397 B2 | 1/2011 | Krijn et al. |
| 7,880,954 B2 | 2/2011 | Sampsell |
| 7,898,521 B2 | 3/2011 | Gally et al. |
| 7,907,319 B2 | 3/2011 | Miles |
| 7,911,428 B2 | 3/2011 | Gally et al. |
| 7,916,378 B2 | 3/2011 | Wang |
| 7,928,928 B2 | 4/2011 | Gally et al. |
| 7,933,475 B2 | 4/2011 | Wang et al. |
| 7,944,602 B2 | 5/2011 | Chui |
| 7,949,213 B2 | 5/2011 | Mienko et al. |
| 7,986,451 B2 | 7/2011 | Gally et al. |
| 8,031,133 B2 | 10/2011 | Gally et al. |
| 8,045,252 B2 | 10/2011 | Chui et al. |
| 8,045,256 B2 | 10/2011 | Kothari |
| 8,059,326 B2 | 11/2011 | Miles |
| 8,068,710 B2 | 11/2011 | Bita et al. |
| 8,072,402 B2 | 12/2011 | Xu |
| 8,111,445 B2 | 2/2012 | Chui et al. |
| 8,111,446 B2 | 2/2012 | Gally et al. |
| 8,169,689 B2 | 5/2012 | Sampsell |
| 8,300,304 B2 | 10/2012 | Gally et al. |
| 8,408,775 B1 | 4/2013 | Coleman |
| 8,872,085 B2 | 10/2014 | Gruhlke et al. |
| 2001/0003487 A1 | 6/2001 | Miles |
| 2001/0003504 A1 | 6/2001 | Ishihara et al. |
| 2001/0010952 A1 | 8/2001 | Abramovich |
| 2001/0019240 A1 | 9/2001 | Takahashi |
| 2001/0019380 A1 | 9/2001 | Ishihara |
| 2001/0019479 A1 | 9/2001 | Nakabayashi et al. |
| 2001/0022636 A1 | 9/2001 | Yang et al. |
| 2001/0026001 A1 | 10/2001 | Yagi |
| 2001/0030861 A1 | 10/2001 | Oda et al. |
| 2001/0049061 A1 | 12/2001 | Nakagaki |
| 2001/0055076 A1 | 12/2001 | Ochi et al. |
| 2001/0055208 A1 | 12/2001 | Kimura |
| 2002/0006036 A1 | 1/2002 | Egawa et al. |
| 2002/0034071 A1 | 3/2002 | Mabuchi |
| 2002/0039155 A1 | 4/2002 | Umemoto |
| 2002/0044445 A1 | 4/2002 | Bohler et al. |
| 2002/0050286 A1 | 5/2002 | Kubota |
| 2002/0050764 A1 | 5/2002 | Koga et al. |
| 2002/0051103 A1 | 5/2002 | Faris et al. |
| 2002/0057399 A1 | 5/2002 | Ishitaka |
| 2002/0060907 A1 | 5/2002 | Saccomanno |
| 2002/0075245 A1 | 6/2002 | Kawashima et al. |
| 2002/0075555 A1 | 6/2002 | Miles |
| 2002/0080465 A1 | 6/2002 | Han |
| 2002/0081089 A1 | 6/2002 | Min et al. |
| 2002/0106182 A1 | 8/2002 | Kawashima |
| 2002/0131151 A1 | 9/2002 | Engler et al. |
| 2002/0149584 A1 | 10/2002 | Simpson et al. |
| 2002/0153486 A1 | 10/2002 | Ishizuya et al. |
| 2002/0154256 A1 | 10/2002 | Gotoh et al. |
| 2002/0167730 A1 | 11/2002 | Needham et al. |
| 2002/0172039 A1 | 11/2002 | Inditsky |
| 2002/0172810 A1 | 11/2002 | Murata et al. |
| 2002/0176035 A1 | 11/2002 | Yamazaki |
| 2003/0001985 A1 | 1/2003 | Doe |
| 2003/0006730 A1 | 1/2003 | Tachibana |
| 2003/0011864 A1 | 1/2003 | Flanders |
| 2003/0012009 A1 | 1/2003 | Suzuki et al. |
| 2003/0016930 A1 | 1/2003 | Inditsky |
| 2003/0030764 A1 | 2/2003 | Lee |
| 2003/0058069 A1 | 3/2003 | Schwartz et al. |
| 2003/0067760 A1 | 4/2003 | Jagt et al. |
| 2003/0071947 A1 | 4/2003 | Shiraogawa et al. |
| 2003/0081154 A1 | 5/2003 | Coleman et al. |
| 2003/0083429 A1 | 5/2003 | Smith et al. |
| 2003/0086030 A1 | 5/2003 | Taniguchi et al. |
| 2003/0086031 A1 | 5/2003 | Taniguchi et al. |
| 2003/0095401 A1 | 5/2003 | Hanson et al. |
| 2003/0098957 A1 | 5/2003 | Haldiman |
| 2003/0099118 A1 | 5/2003 | Saitoh et al. |
| 2003/0103177 A1 | 6/2003 | Maeda et al. |
| 2003/0103344 A1 | 6/2003 | Niida et al. |
| 2003/0107692 A1 | 6/2003 | Sekiguchi |
| 2003/0123245 A1 | 7/2003 | Parker et al. |
| 2003/0136759 A1 | 7/2003 | Mikolas |
| 2003/0137617 A1 | 7/2003 | Cornelissen et al. |
| 2003/0142247 A1 | 7/2003 | Nishiyama et al. |
| 2003/0151821 A1 | 8/2003 | Favalora |
| 2003/0161040 A1 | 8/2003 | Ishii |
| 2003/0165067 A1 | 9/2003 | Imamura et al. |
| 2003/0169385 A1 | 9/2003 | Okuwaki |
| 2003/0169386 A1 | 9/2003 | Goto et al. |
| 2003/0184690 A1 | 10/2003 | Ogiwara et al. |
| 2003/0193630 A1 | 10/2003 | Chiou |

(56) References Cited

U.S. PATENT DOCUMENTS

| | | |
|---|---|---|
| 2003/0206281 A1 | 11/2003 | Jain |
| 2003/0210222 A1 | 11/2003 | Ogiwara et al. |
| 2003/0210363 A1 | 11/2003 | Yasukawa |
| 2003/0210366 A1 | 11/2003 | Huang et al. |
| 2003/0210367 A1 | 11/2003 | Nakano et al. |
| 2003/0213514 A1 | 11/2003 | Ortabasi |
| 2003/0214621 A1 | 11/2003 | Kim et al. |
| 2003/0222857 A1 | 12/2003 | Abileah |
| 2003/0222980 A1 | 12/2003 | Miyagaki et al. |
| 2003/0231483 A1 | 12/2003 | Higashiyama |
| 2004/0001169 A1 | 1/2004 | Saiki |
| 2004/0017599 A1 | 1/2004 | Yang |
| 2004/0027339 A1 | 2/2004 | Schulz |
| 2004/0032401 A1 | 2/2004 | Nakazawa et al. |
| 2004/0032659 A1 | 2/2004 | Drinkwater |
| 2004/0042233 A1 | 3/2004 | Suzuki et al. |
| 2004/0051929 A1 | 3/2004 | Sampsell et al. |
| 2004/0061946 A1 | 4/2004 | Yoshikawa et al. |
| 2004/0066477 A1 | 4/2004 | Morimoto et al. |
| 2004/0071937 A1 | 4/2004 | Chien et al. |
| 2004/0080807 A1 | 4/2004 | Chen et al. |
| 2004/0085748 A1 | 5/2004 | Sugiura |
| 2004/0100796 A1 | 5/2004 | Ward |
| 2004/0109303 A1 | 6/2004 | Olczak |
| 2004/0109305 A1 | 6/2004 | Chisholm et al. |
| 2004/0114242 A1 | 6/2004 | Sharp |
| 2004/0115339 A1 | 6/2004 | Ito |
| 2004/0125048 A1 | 7/2004 | Fukuda et al. |
| 2004/0135494 A1 | 7/2004 | Miyatake |
| 2004/0170373 A1 | 9/2004 | Kim |
| 2004/0174583 A1 | 9/2004 | Chen et al. |
| 2004/0175577 A1 | 9/2004 | Lin et al. |
| 2004/0188150 A1 | 9/2004 | Richard et al. |
| 2004/0188599 A1 | 9/2004 | Viktorovitch |
| 2004/0207605 A1 | 10/2004 | Mackey et al. |
| 2004/0207995 A1 | 10/2004 | Park et al. |
| 2004/0217264 A1 | 11/2004 | Wood et al. |
| 2004/0217919 A1 | 11/2004 | Piehl et al. |
| 2004/0228109 A1 | 11/2004 | Leu et al. |
| 2004/0228112 A1 | 11/2004 | Takata |
| 2004/0233357 A1 | 11/2004 | Fujimori et al. |
| 2004/0246743 A1 | 12/2004 | Lee et al. |
| 2004/0248524 A1 | 12/2004 | Flegeo |
| 2005/0002082 A1 | 1/2005 | Miles |
| 2005/0002175 A1 | 1/2005 | Matsui et al. |
| 2005/0010568 A1 | 1/2005 | Nagatomo et al. |
| 2005/0024849 A1 | 2/2005 | Parker et al. |
| 2005/0024890 A1 | 2/2005 | Yamamoto et al. |
| 2005/0035699 A1 | 2/2005 | Tsai |
| 2005/0036095 A1 | 2/2005 | Yeh et al. |
| 2005/0041175 A1 | 2/2005 | Akiyama et al. |
| 2005/0042117 A1 | 2/2005 | Lin |
| 2005/0046011 A1 | 3/2005 | Chen et al. |
| 2005/0057442 A1 | 3/2005 | Way |
| 2005/0069209 A1 | 3/2005 | Damera-Venkata et al. |
| 2005/0069254 A1 | 3/2005 | Schultheis et al. |
| 2005/0073507 A1 | 4/2005 | Richter et al. |
| 2005/0088719 A1 | 4/2005 | Patel et al. |
| 2005/0099792 A1 | 5/2005 | Matsui et al. |
| 2005/0101059 A1 | 5/2005 | Yang et al. |
| 2005/0117088 A1 | 6/2005 | Van |
| 2005/0117623 A1 | 6/2005 | Shchukin et al. |
| 2005/0120553 A1 | 6/2005 | Brown et al. |
| 2005/0133761 A1 | 6/2005 | Thielemans |
| 2005/0141065 A1 | 6/2005 | Masamoto |
| 2005/0146897 A1 | 7/2005 | Mimura et al. |
| 2005/0180145 A1 | 8/2005 | Okuwaki |
| 2005/0195175 A1 | 9/2005 | Anderson |
| 2005/0195370 A1 | 9/2005 | Gore et al. |
| 2005/0195462 A1 | 9/2005 | Lin |
| 2005/0206802 A1 | 9/2005 | Creemers |
| 2005/0207016 A1 | 9/2005 | Ando |
| 2005/0213346 A1 | 9/2005 | Kao et al. |
| 2005/0224694 A1 | 10/2005 | Yaung |
| 2005/0225686 A1 | 10/2005 | Brummack et al. |
| 2005/0231977 A1 | 10/2005 | Hayakawa |
| 2005/0231981 A1 | 10/2005 | Hoelen et al. |
| 2005/0242693 A1 | 11/2005 | Hayashi et al. |
| 2005/0248524 A1 | 11/2005 | Feng et al. |
| 2005/0248698 A1 | 11/2005 | Okamoto et al. |
| 2005/0259302 A9 | 11/2005 | Metz et al. |
| 2005/0259939 A1 | 11/2005 | Rinko |
| 2005/0271325 A1 | 12/2005 | Anderson et al. |
| 2006/0002141 A1 | 1/2006 | Ouderkirk et al. |
| 2006/0002655 A1 | 1/2006 | Smits |
| 2006/0002675 A1 | 1/2006 | Choi et al. |
| 2006/0007510 A1 | 1/2006 | Nishide et al. |
| 2006/0012733 A1 | 1/2006 | Jin et al. |
| 2006/0012739 A1 | 1/2006 | Shibazaki |
| 2006/0022966 A1 | 2/2006 | Mar |
| 2006/0024017 A1 | 2/2006 | Page et al. |
| 2006/0024880 A1 | 2/2006 | Chui et al. |
| 2006/0044523 A1 | 3/2006 | Teijido et al. |
| 2006/0044928 A1 | 3/2006 | Chui et al. |
| 2006/0050032 A1 | 3/2006 | Gunner et al. |
| 2006/0051048 A1 | 3/2006 | Gardiner et al. |
| 2006/0056000 A1 | 3/2006 | Mignard |
| 2006/0056166 A1 | 3/2006 | Yeo et al. |
| 2006/0061705 A1 | 3/2006 | Onishi |
| 2006/0062016 A1 | 3/2006 | Dejima et al. |
| 2006/0065940 A1 | 3/2006 | Kothari |
| 2006/0066503 A1 | 3/2006 | Sampsell et al. |
| 2006/0066504 A1 | 3/2006 | Sampsell et al. |
| 2006/0066557 A1 | 3/2006 | Floyd |
| 2006/0066560 A1 | 3/2006 | Gally et al. |
| 2006/0066586 A1 | 3/2006 | Gally et al. |
| 2006/0066595 A1 | 3/2006 | Sampsell et al. |
| 2006/0066596 A1 | 3/2006 | Sampsell et al. |
| 2006/0066598 A1 | 3/2006 | Floyd |
| 2006/0066600 A1 | 3/2006 | Palmateer |
| 2006/0066601 A1 | 3/2006 | Kothari et al. |
| 2006/0066641 A1 | 3/2006 | Gally et al. |
| 2006/0066863 A1 | 3/2006 | Cummings et al. |
| 2006/0066936 A1 | 3/2006 | Chui et al. |
| 2006/0066937 A1 | 3/2006 | Chui |
| 2006/0066938 A1 | 3/2006 | Chui |
| 2006/0067028 A1 | 3/2006 | Floyd |
| 2006/0072315 A1 | 4/2006 | Han et al. |
| 2006/0072339 A1 | 4/2006 | Li et al. |
| 2006/0073623 A1 | 4/2006 | Conley, Jr. et al. |
| 2006/0076631 A1 | 4/2006 | Palmateer et al. |
| 2006/0076632 A1 | 4/2006 | Palmateer et al. |
| 2006/0077126 A1 | 4/2006 | Kothari |
| 2006/0077127 A1 | 4/2006 | Sampsell et al. |
| 2006/0077146 A1 | 4/2006 | Palmateer |
| 2006/0077148 A1 | 4/2006 | Gally et al. |
| 2006/0077149 A1 | 4/2006 | Gally et al. |
| 2006/0077504 A1 | 4/2006 | Floyd |
| 2006/0077505 A1 | 4/2006 | Chui et al. |
| 2006/0077518 A1 | 4/2006 | Chui et al. |
| 2006/0077520 A1 | 4/2006 | Chui et al. |
| 2006/0077521 A1 | 4/2006 | Gally et al. |
| 2006/0077523 A1 | 4/2006 | Cummings et al. |
| 2006/0077524 A1 | 4/2006 | Palmateer |
| 2006/0077528 A1 | 4/2006 | Floyd |
| 2006/0077529 A1 | 4/2006 | Chui et al. |
| 2006/0077533 A1 | 4/2006 | Miles et al. |
| 2006/0077617 A1 | 4/2006 | Floyd |
| 2006/0079048 A1 | 4/2006 | Sampsell |
| 2006/0083028 A1 | 4/2006 | Sun et al. |
| 2006/0091824 A1 | 5/2006 | Pate et al. |
| 2006/0103613 A1 | 5/2006 | Chui |
| 2006/0103643 A1 | 5/2006 | Mathew et al. |
| 2006/0103912 A1 | 5/2006 | Katoh et al. |
| 2006/0109682 A1 | 5/2006 | Ko et al. |
| 2006/0109686 A1 | 5/2006 | Sugiura |
| 2006/0110090 A1 | 5/2006 | Ellwood, Jr. |
| 2006/0114244 A1 | 6/2006 | Saxena et al. |
| 2006/0126142 A1 | 6/2006 | Choi |
| 2006/0130889 A1 | 6/2006 | Li et al. |
| 2006/0132383 A1 | 6/2006 | Gally et al. |
| 2006/0164861 A1 | 7/2006 | Maeda et al. |
| 2006/0176241 A1 | 8/2006 | Sampsell |
| 2006/0176487 A1 | 8/2006 | Cummings et al. |

(56) References Cited

U.S. PATENT DOCUMENTS

| | | |
|---|---|---|
| 2006/0181903 A1 | 8/2006 | Okuwaki |
| 2006/0187676 A1 | 8/2006 | Ishikura |
| 2006/0193582 A1 | 8/2006 | Ouderkirk et al. |
| 2006/0209012 A1 | 9/2006 | Hagood |
| 2006/0209385 A1 | 9/2006 | Liu et al. |
| 2006/0215958 A1 | 9/2006 | Yeo et al. |
| 2006/0227532 A1 | 10/2006 | Ko et al. |
| 2006/0246233 A1 | 11/2006 | Fukuda |
| 2006/0250335 A1 | 11/2006 | Stewart et al. |
| 2006/0250350 A1 | 11/2006 | Kothari et al. |
| 2006/0250676 A1 | 11/2006 | Hagood et al. |
| 2006/0262562 A1 | 11/2006 | Fukasawa et al. |
| 2006/0265919 A1 | 11/2006 | Huang |
| 2006/0268574 A1 | 11/2006 | Jung et al. |
| 2006/0274243 A1 | 12/2006 | Iijima et al. |
| 2006/0279558 A1 | 12/2006 | Van Delden et al. |
| 2006/0285356 A1 | 12/2006 | Tseng |
| 2006/0286381 A1 | 12/2006 | Naito et al. |
| 2006/0290253 A1 | 12/2006 | Yeo et al. |
| 2006/0291769 A1 | 12/2006 | Spoonhower et al. |
| 2007/0018585 A1 | 1/2007 | Ijzerman et al. |
| 2007/0036492 A1 | 2/2007 | Lee |
| 2007/0042524 A1 | 2/2007 | Kogut et al. |
| 2007/0064294 A1 | 3/2007 | Hoshino et al. |
| 2007/0070270 A1 | 3/2007 | Yu et al. |
| 2007/0097694 A1 | 5/2007 | Faase et al. |
| 2007/0114523 A1 | 5/2007 | Oumi et al. |
| 2007/0116424 A1 | 5/2007 | Ting et al. |
| 2007/0125415 A1 | 6/2007 | Sachs |
| 2007/0132843 A1 | 6/2007 | Miles |
| 2007/0133935 A1 | 6/2007 | Fine |
| 2007/0134438 A1 | 6/2007 | Fabick et al. |
| 2007/0146887 A1 | 6/2007 | Ikeda et al. |
| 2007/0147087 A1 | 6/2007 | Parker et al. |
| 2007/0171330 A1 | 7/2007 | Hung et al. |
| 2007/0187852 A1 | 8/2007 | Parker et al. |
| 2007/0189036 A1 | 8/2007 | Chen et al. |
| 2007/0201056 A1 | 8/2007 | Cok et al. |
| 2007/0201234 A1 | 8/2007 | Ottermann |
| 2007/0210163 A1 | 9/2007 | Han |
| 2007/0229737 A1 | 10/2007 | Takeda |
| 2007/0229936 A1 | 10/2007 | Miles |
| 2007/0241340 A1 | 10/2007 | Pan |
| 2007/0247704 A1 | 10/2007 | Mignard |
| 2007/0268695 A1 | 11/2007 | Seetzen |
| 2007/0279727 A1 | 12/2007 | Gandhi et al. |
| 2007/0279935 A1 | 12/2007 | Gardiner et al. |
| 2007/0291362 A1 | 12/2007 | Hill et al. |
| 2007/0292091 A1 | 12/2007 | Fujii et al. |
| 2008/0030650 A1 | 2/2008 | Kitagawa et al. |
| 2008/0037281 A1 | 2/2008 | Chang |
| 2008/0042154 A1 | 2/2008 | Wano |
| 2008/0084600 A1 | 4/2008 | Bita et al. |
| 2008/0089063 A1 | 4/2008 | Chen |
| 2008/0090025 A1 | 4/2008 | Freking et al. |
| 2008/0094853 A1 | 4/2008 | Kim et al. |
| 2008/0137175 A1 | 6/2008 | Lin |
| 2008/0170414 A1 | 7/2008 | Wang |
| 2008/0192259 A1 | 8/2008 | Sumiyama |
| 2008/0192484 A1 | 8/2008 | Lee et al. |
| 2008/0232135 A1 | 9/2008 | Kinder et al. |
| 2008/0239216 A1 | 10/2008 | Miyamoto et al. |
| 2008/0266333 A1 | 10/2008 | Silverstein et al. |
| 2008/0278796 A1 | 11/2008 | Roosendaal et al. |
| 2008/0285307 A1 | 11/2008 | Aylward et al. |
| 2008/0285308 A1 | 11/2008 | Clary et al. |
| 2009/0050454 A1 | 2/2009 | Matsukawa et al. |
| 2009/0073540 A1 | 3/2009 | Kothari et al. |
| 2009/0086301 A1 | 4/2009 | Gally et al. |
| 2009/0086466 A1 | 4/2009 | Sugita et al. |
| 2009/0090611 A1 | 4/2009 | Zeijlon et al. |
| 2009/0096956 A1 | 4/2009 | Uehara et al. |
| 2009/0101192 A1 | 4/2009 | Kothari et al. |
| 2009/0101623 A1 | 4/2009 | Bita et al. |
| 2009/0103161 A1 | 4/2009 | Kothari et al. |
| 2009/0103165 A1 | 4/2009 | Kothari et al. |
| 2009/0103166 A1 | 4/2009 | Khazeni et al. |
| 2009/0103311 A1 | 4/2009 | Wu et al. |
| 2009/0126777 A1 | 5/2009 | Khazeni et al. |
| 2009/0126792 A1 | 5/2009 | Gruhlke et al. |
| 2009/0151771 A1 | 6/2009 | Kothari et al. |
| 2009/0168459 A1 | 7/2009 | Holman et al. |
| 2009/0190373 A1 | 7/2009 | Bita et al. |
| 2009/0196068 A1 | 8/2009 | Wang et al. |
| 2009/0199893 A1 | 8/2009 | Bita et al. |
| 2009/0199900 A1 | 8/2009 | Bita et al. |
| 2009/0201301 A1 | 8/2009 | Mienko et al. |
| 2009/0201565 A1 | 8/2009 | Bita et al. |
| 2009/0213298 A1 | 8/2009 | Mimura et al. |
| 2009/0225394 A1 | 9/2009 | Chui et al. |
| 2009/0225396 A1 | 9/2009 | Sampsell |
| 2009/0231275 A1 | 9/2009 | Odgers |
| 2009/0231877 A1 | 9/2009 | Mienko et al. |
| 2009/0242024 A1 | 10/2009 | Kothari et al. |
| 2009/0244690 A1 | 10/2009 | Lee |
| 2009/0251752 A1 | 10/2009 | Gruhlke et al. |
| 2009/0255569 A1 | 10/2009 | Sampsell et al. |
| 2009/0257108 A1 | 10/2009 | Gruhlke et al. |
| 2009/0293955 A1 | 12/2009 | Kothari et al. |
| 2009/0293995 A1 | 12/2009 | Tanaka et al. |
| 2009/0294785 A1 | 12/2009 | Cok |
| 2009/0296193 A1 | 12/2009 | Bita et al. |
| 2009/0303417 A1 | 12/2009 | Mizushima et al. |
| 2009/0323144 A1 | 12/2009 | Gruhlke et al. |
| 2009/0323153 A1 | 12/2009 | Sampsell |
| 2010/0026727 A1 | 2/2010 | Bita et al. |
| 2010/0033988 A1 | 2/2010 | Chiu et al. |
| 2010/0039832 A1 | 2/2010 | Ahlgren et al. |
| 2010/0052880 A1 | 3/2010 | Laitinen et al. |
| 2010/0096006 A1 | 4/2010 | Griffiths et al. |
| 2010/0096011 A1 | 4/2010 | Griffiths et al. |
| 2010/0110340 A1 | 5/2010 | Mather et al. |
| 2010/0118239 A1 | 5/2010 | Roosendaal et al. |
| 2010/0141557 A1 | 6/2010 | Gruhlke et al. |
| 2010/0172012 A1 | 7/2010 | Sampsell |
| 2010/0182308 A1 | 7/2010 | Holman et al. |
| 2010/0188367 A1 | 7/2010 | Nagafuji et al. |
| 2010/0195310 A1 | 8/2010 | Baar |
| 2010/0214642 A1 | 8/2010 | Miles |
| 2010/0226118 A1 | 9/2010 | Baar |
| 2010/0238529 A1 | 9/2010 | Sampsell et al. |
| 2010/0245370 A1 | 9/2010 | Narayanan et al. |
| 2010/0245975 A1 | 9/2010 | Cummings |
| 2010/0278480 A1 | 11/2010 | Vasylyev |
| 2010/0302185 A1 | 12/2010 | Han et al. |
| 2010/0302616 A1 | 12/2010 | Bita et al. |
| 2010/0302802 A1 | 12/2010 | Bita et al. |
| 2010/0302803 A1 | 12/2010 | Bita et al. |
| 2010/0309103 A1 | 12/2010 | Sampsell |
| 2010/0309540 A1 | 12/2010 | Miles |
| 2011/0025727 A1 | 2/2011 | Li et al. |
| 2011/0032214 A1 | 2/2011 | Gruhlke et al. |
| 2011/0043889 A1 | 2/2011 | Mignard |
| 2011/0075246 A1 | 3/2011 | Wang |
| 2011/0157058 A1 | 6/2011 | Bita et al. |
| 2011/0157093 A1 | 6/2011 | Bita et al. |
| 2011/0199667 A1 | 8/2011 | Wang et al. |
| 2011/0199669 A1 | 8/2011 | Chui |
| 2011/0316861 A1 | 12/2011 | Gally et al. |
| 2012/0057107 A1 | 3/2012 | Kitagawa et al. |
| 2012/0069031 A1 | 3/2012 | Bita et al. |
| 2012/0081406 A1 | 4/2012 | Li et al. |
| 2012/0206788 A1 | 8/2012 | Sampsell |
| 2013/0106712 A1 | 5/2013 | Cummings et al. |
| 2013/0127922 A1 | 5/2013 | Poliakov et al. |

FOREIGN PATENT DOCUMENTS

| | | |
|---|---|---|
| CN | 1272922 | 11/2000 |
| CN | 1286424 | 3/2001 |
| CN | 1381752 A | 11/2002 |
| CN | 1384392 A | 12/2002 |
| CN | 1409157 A | 4/2003 |
| CN | 1420703 A | 5/2003 |

(56) References Cited

FOREIGN PATENT DOCUMENTS

| | | | |
|---|---|---|---|
| CN | 1447887 A | 10/2003 |
| CN | 2624220 Y | 7/2004 |
| CN | 1517743 A | 8/2004 |
| CN | 1559000 A | 12/2004 |
| CN | 1639596 | 7/2005 |
| CN | 1643439 A | 7/2005 |
| CN | 1670593 A | 9/2005 |
| CN | 1795403 | 6/2006 |
| CN | 1811549 A | 8/2006 |
| CN | 101019067 A | 8/2007 |
| DE | 3402746 | 8/1985 |
| DE | 196 22 748 | 12/1997 |
| DE | 19942513 A1 | 3/2001 |
| DE | 10228946 A1 | 1/2004 |
| DE | 10329917 | 2/2005 |
| DE | 102007025092 A1 | 12/2008 |
| EP | 0223136 A2 | 5/1987 |
| EP | 0278038 A1 | 8/1988 |
| EP | 0389031 A1 | 9/1990 |
| EP | 0539099 A2 | 4/1993 |
| EP | 0590511 A1 | 4/1994 |
| EP | 0621500 A1 | 10/1994 |
| EP | 0 667 548 | 8/1995 |
| EP | 0786911 A2 | 7/1997 |
| EP | 0 822 441 | 2/1998 |
| EP | 0830032 A2 | 3/1998 |
| EP | 0855745 A2 | 7/1998 |
| EP | 0867747 A2 | 9/1998 |
| EP | 0879991 A2 | 11/1998 |
| EP | 0895274 A1 | 2/1999 |
| EP | 0907050 A1 | 4/1999 |
| EP | 0957392 A1 | 11/1999 |
| EP | 0984314 A2 | 3/2000 |
| EP | 1003062 A1 | 5/2000 |
| EP | 1014161 A1 | 6/2000 |
| EP | 1081633 A2 | 3/2001 |
| EP | 1089115 A1 | 4/2001 |
| EP | 1093105 A1 | 4/2001 |
| EP | 1113218 A1 | 7/2001 |
| EP | 1116987 A2 | 7/2001 |
| EP | 1122586 A2 | 8/2001 |
| EP | 1127984 A1 | 8/2001 |
| EP | 1143270 A2 | 10/2001 |
| EP | 1199512 A1 | 4/2002 |
| EP | 1231757 A2 | 8/2002 |
| EP | 1251454 A2 | 10/2002 |
| EP | 1271223 A2 | 1/2003 |
| EP | 1279892 A1 | 1/2003 |
| EP | 1296094 A1 | 3/2003 |
| EP | 1298635 A2 | 4/2003 |
| EP | 1306609 A1 | 5/2003 |
| EP | 1329664 A1 | 7/2003 |
| EP | 1336876 A1 | 8/2003 |
| EP | 1341025 A1 | 9/2003 |
| EP | 1347315 A1 | 9/2003 |
| EP | 1389775 A2 | 2/2004 |
| EP | 1413543 A1 | 4/2004 |
| EP | 1437610 A1 | 7/2004 |
| EP | 1445629 A1 | 8/2004 |
| EP | 1450418 A2 | 8/2004 |
| EP | 1519218 A1 | 3/2005 |
| EP | 1531302 A1 | 5/2005 |
| EP | 1544537 A1 | 6/2005 |
| EP | 1577701 A1 | 9/2005 |
| EP | 1640761 A1 | 3/2006 |
| EP | 1670065 A1 | 6/2006 |
| EP | 1698918 A1 | 9/2006 |
| EP | 1734401 A1 | 12/2006 |
| EP | 1748305 A1 | 1/2007 |
| EP | 1780585 A2 | 5/2007 |
| EP | 1800183 | 6/2007 |
| EP | 1947551 A2 | 7/2008 |
| EP | 2141408 A2 | 1/2010 |
| EP | 2163920 A1 | 3/2010 |
| EP | 2251731 A1 | 11/2010 |
| EP | 2259122 | 12/2010 |
| EP | 2259123 | 12/2010 |
| EP | 2264508 | 12/2010 |
| EP | 2264509 | 12/2010 |
| EP | 2264510 | 12/2010 |
| EP | 2366942 | 9/2011 |
| EP | 2366943 | 9/2011 |
| EP | 2366944 | 9/2011 |
| EP | 2366945 | 9/2011 |
| EP | 2366946 | 9/2011 |
| EP | 2388234 A1 | 11/2011 |
| GB | 2260203 A | 4/1993 |
| GB | 2 278 222 | 11/1994 |
| GB | 2315356 A | 1/1998 |
| GB | 2321532 A | 7/1998 |
| GB | 2331615 | 5/1999 |
| GB | 2336933 | 11/1999 |
| GB | 2340281 | 2/2000 |
| GB | 2351834 A | 1/2001 |
| JP | 56010976 | 2/1981 |
| JP | 56010977 | 2/1981 |
| JP | 56088111 | 7/1981 |
| JP | 573266 | 1/1982 |
| JP | 58115781 | 7/1983 |
| JP | 60147718 | 8/1985 |
| JP | 60165621 A | 8/1985 |
| JP | 60242408 A | 12/1985 |
| JP | 62-009317 | 1/1987 |
| JP | S6395489 A | 4/1988 |
| JP | 02-068513 | 3/1990 |
| JP | 02151079 | 6/1990 |
| JP | 03-199920 | 8/1991 |
| JP | 04 081816 | 3/1992 |
| JP | 4053220 U | 5/1992 |
| JP | 04190323 | 7/1992 |
| JP | 04238321 | 8/1992 |
| JP | 05 281479 | 10/1993 |
| JP | 6209114 A | 7/1994 |
| JP | 6265870 A | 9/1994 |
| JP | 07509327 | 10/1995 |
| JP | 08 018990 | 1/1996 |
| JP | 8050283 A | 2/1996 |
| JP | 08094992 | 4/1996 |
| JP | 08 271874 | 10/1996 |
| JP | 9005735 A | 1/1997 |
| JP | 09022012 | 1/1997 |
| JP | 09068722 | 3/1997 |
| JP | 09160032 | 6/1997 |
| JP | 9171111 A | 6/1997 |
| JP | 09 189869 | 7/1997 |
| JP | 09189910 A | 7/1997 |
| JP | 09507920 | 8/1997 |
| JP | 9230324 A | 9/1997 |
| JP | 09260696 | 10/1997 |
| JP | 09281917 | 10/1997 |
| JP | 09 307140 | 11/1997 |
| JP | 09311333 | 12/1997 |
| JP | 10 500224 | 1/1998 |
| JP | 10096910 A | 4/1998 |
| JP | 10186249 A | 7/1998 |
| JP | 10202948 | 8/1998 |
| JP | 10325953 A | 12/1998 |
| JP | H10326515 A | 12/1998 |
| JP | 11002712 A | 1/1999 |
| JP | 11002764 A | 1/1999 |
| JP | 11052887 A | 2/1999 |
| JP | 11 064882 | 3/1999 |
| JP | 11064836 A | 3/1999 |
| JP | 11064882 A | 3/1999 |
| JP | 11072721 A | 3/1999 |
| JP | 11 160687 | 6/1999 |
| JP | 11167808 A | 6/1999 |
| JP | 11 174234 | 7/1999 |
| JP | 11184387 A | 7/1999 |
| JP | 11 211999 | 8/1999 |
| JP | 11231321 A | 8/1999 |
| JP | 11232919 | 8/1999 |
| JP | 11-258558 | 9/1999 |
| JP | 11249132 A | 9/1999 |

(56) References Cited

FOREIGN PATENT DOCUMENTS

| | | |
|---|---|---|
| JP | 11254752 A | 9/1999 |
| JP | 11295725 | 10/1999 |
| JP | 11295726 A | 10/1999 |
| JP | 11316553 A | 11/1999 |
| JP | 11326898 A | 11/1999 |
| JP | 11326903 A | 11/1999 |
| JP | 2000 500245 | 1/2000 |
| JP | 2000028933 A | 1/2000 |
| JP | 2000075287 A | 3/2000 |
| JP | 2000075293 A | 3/2000 |
| JP | 2000081848 | 3/2000 |
| JP | 2000089225 A | 3/2000 |
| JP | 2000147262 A | 5/2000 |
| JP | 2000181367 | 6/2000 |
| JP | 2000193933 A | 7/2000 |
| JP | 2000214804 A | 8/2000 |
| JP | 2000258622 A | 9/2000 |
| JP | 2000 514568 | 10/2000 |
| JP | 2000305074 | 11/2000 |
| JP | 2000314882 A | 11/2000 |
| JP | 2000338310 A | 12/2000 |
| JP | 2001021883 | 1/2001 |
| JP | 2001110218 A | 4/2001 |
| JP | 2001222276 A | 8/2001 |
| JP | 2001283622 A | 10/2001 |
| JP | 2001297615 A | 10/2001 |
| JP | 2001305312 | 10/2001 |
| JP | 2001324606 A | 11/2001 |
| JP | 2001 343514 | 12/2001 |
| JP | 2001345458 | 12/2001 |
| JP | 2002014344 A | 1/2002 |
| JP | 2002040339 A | 2/2002 |
| JP | 2002042525 A | 2/2002 |
| JP | 2002062505 A | 2/2002 |
| JP | 2002071965 A | 3/2002 |
| JP | 2002072284 A | 3/2002 |
| JP | 2002090549 | 3/2002 |
| JP | 2002098838 A | 4/2002 |
| JP | 2002108227 | 4/2002 |
| JP | 2002124113 A | 4/2002 |
| JP | 2002131551 A | 5/2002 |
| JP | 2002139630 A | 5/2002 |
| JP | 2002 174780 | 6/2002 |
| JP | 2002196151 A | 7/2002 |
| JP | 2002208307 A | 7/2002 |
| JP | 2002523798 | 7/2002 |
| JP | 2002229023 A | 8/2002 |
| JP | 2002236290 A | 8/2002 |
| JP | 2002245835 A | 8/2002 |
| JP | 2002 287047 | 10/2002 |
| JP | 2002297044 | 10/2002 |
| JP | 2002 328313 | 11/2002 |
| JP | 2002365438 A | 12/2002 |
| JP | 2003004950 A | 1/2003 |
| JP | 2003007114 A | 1/2003 |
| JP | 2003021821 A | 1/2003 |
| JP | 2003057652 | 2/2003 |
| JP | 2003057653 A | 2/2003 |
| JP | 2003066236 A | 3/2003 |
| JP | 2003066451 | 3/2003 |
| JP | 2003131215 | 5/2003 |
| JP | 2003140118 A | 5/2003 |
| JP | 2003147351 A | 5/2003 |
| JP | 2003149642 | 5/2003 |
| JP | 2003149643 | 5/2003 |
| JP | 2003173713 A | 6/2003 |
| JP | 2003177336 A | 6/2003 |
| JP | 2003177405 A | 6/2003 |
| JP | 2003186008 A | 7/2003 |
| JP | 2003188959 A | 7/2003 |
| JP | 2003195201 A | 7/2003 |
| JP | 2003202568 A | 7/2003 |
| JP | 2003222861 A | 8/2003 |
| JP | 2003-248181 | 9/2003 |
| JP | 2003255140 A | 9/2003 |
| JP | 2003255344 A | 9/2003 |
| JP | 2003262867 A | 9/2003 |
| JP | 2003315560 A | 11/2003 |
| JP | 2003315694 A | 11/2003 |
| JP | 2003344881 | 12/2003 |
| JP | 2004006003 A | 1/2004 |
| JP | 2004012918 | 1/2004 |
| JP | 2004062099 | 2/2004 |
| JP | 2004070189 A | 3/2004 |
| JP | 2004086221 A | 3/2004 |
| JP | 2004087409 A | 3/2004 |
| JP | 2004111278 A | 4/2004 |
| JP | 2004126196 A | 4/2004 |
| JP | 2004510185 | 4/2004 |
| JP | 2004145109 A | 5/2004 |
| JP | 2004-206049 | 7/2004 |
| JP | 2004199006 A | 7/2004 |
| JP | 2004212673 A | 7/2004 |
| JP | 2004219843 A | 8/2004 |
| JP | 2004302135 A | 10/2004 |
| JP | 2005031219 A | 2/2005 |
| JP | 2005135899 A | 5/2005 |
| JP | 2005259365 | 9/2005 |
| JP | 2005308871 A | 11/2005 |
| JP | 2005316178 | 11/2005 |
| JP | 2006039056 A | 2/2006 |
| JP | 2006065360 | 3/2006 |
| JP | 2006099113 A | 4/2006 |
| JP | 2006107993 | 4/2006 |
| JP | 2006120571 | 5/2006 |
| JP | 2006133743 A | 5/2006 |
| JP | 2006179495 A | 7/2006 |
| JP | 2007027150 A | 2/2007 |
| JP | 2007218540 A | 8/2007 |
| JP | 2008514992 | 5/2008 |
| JP | 2009300966 A | 12/2009 |
| JP | 2010156979 | 7/2010 |
| KR | 20020010322 | 2/2002 |
| KR | 10-0329769-0000 | 3/2002 |
| KR | 20030029769 | 4/2003 |
| KR | 1020030029647 | 4/2003 |
| KR | 20030081662 | 10/2003 |
| KR | 2004-0016570 | 2/2004 |
| KR | 20070109557 A | 11/2007 |
| KR | 20070117137 A | 12/2007 |
| TW | 412646 B | 11/2000 |
| TW | 520445 | 2/2003 |
| TW | 200302775 | 8/2003 |
| TW | 552720 B | 9/2003 |
| TW | 556009 | 10/2003 |
| TW | 556009 B | 10/2003 |
| TW | 567388 B | 12/2003 |
| TW | 579368 B | 3/2004 |
| TW | 594155 | 6/2004 |
| TW | 200500717 | 1/2005 |
| TW | 200512518 | 4/2005 |
| WO | WO-9406871 A1 | 3/1994 |
| WO | WO-9501584 A1 | 1/1995 |
| WO | WO-9514256 A1 | 5/1995 |
| WO | WO-9515582 A1 | 6/1995 |
| WO | WO 96/08833 | 3/1996 |
| WO | WO-9701240 A1 | 1/1997 |
| WO | WO 97/17628 | 5/1997 |
| WO | WO-9716756 A1 | 5/1997 |
| WO | WO-9744707 A2 | 11/1997 |
| WO | WO 97/46908 | 12/1997 |
| WO | WO-9819201 A1 | 5/1998 |
| WO | WO-9832047 A1 | 7/1998 |
| WO | WO-9835182 A1 | 8/1998 |
| WO | WO-9852094 A1 | 11/1998 |
| WO | WO-9904296 A1 | 1/1999 |
| WO | WO-9963394 A1 | 12/1999 |
| WO | WO-9967678 A2 | 12/1999 |
| WO | WO-9967680 A1 | 12/1999 |
| WO | WO-0011502 A1 | 3/2000 |
| WO | WO-0050807 A1 | 8/2000 |
| WO | WO-0129148 A1 | 4/2001 |
| WO | WO-0157434 A1 | 8/2001 |
| WO | WO 01/81994 | 11/2001 |

(56) References Cited

FOREIGN PATENT DOCUMENTS

| | | |
|---|---|---|
| WO | WO-0184228 A1 | 11/2001 |
| WO | WO-0184229 A1 | 11/2001 |
| WO | WO-0190637 A1 | 11/2001 |
| WO | WO-0206858 A2 | 1/2002 |
| WO | WO-0224570 A1 | 3/2002 |
| WO | WO-02071132 A2 | 9/2002 |
| WO | WO-02097324 A1 | 12/2002 |
| WO | WO-03027569 A1 | 4/2003 |
| WO | WO-03032058 A1 | 4/2003 |
| WO | WO-03038509 A2 | 5/2003 |
| WO | WO-03062912 A1 | 7/2003 |
| WO | WO-03075207 A2 | 9/2003 |
| WO | WO-03105198 A1 | 12/2003 |
| WO | WO 2004/006003 | 1/2004 |
| WO | WO-2004003643 A1 | 1/2004 |
| WO | WO-2004012004 A1 | 2/2004 |
| WO | WO-2004015489 A1 | 2/2004 |
| WO | WO-2004027514 A2 | 4/2004 |
| WO | WO-2004036270 A1 | 4/2004 |
| WO | WO-2004036294 A2 | 4/2004 |
| WO | WO-2004068460 A1 | 8/2004 |
| WO | WO-2004088372 A1 | 10/2004 |
| WO | WO-2004114418 A1 | 12/2004 |
| WO | WO-2005011012 A1 | 2/2005 |
| WO | WO-2005088367 A1 | 9/2005 |
| WO | WO-2005111669 A1 | 11/2005 |
| WO | WO-2006008702 A2 | 1/2006 |
| WO | WO-2006026743 A1 | 3/2006 |
| WO | WO-2006031545 A1 | 3/2006 |
| WO | WO-2006036440 | 4/2006 |
| WO | WO-2006036451 A1 | 4/2006 |
| WO | WO-2006036496 | 4/2006 |
| WO | WO-2006036519 | 4/2006 |
| WO | WO-2006137337 | 12/2006 |
| WO | WO-2007064133 A1 | 6/2007 |
| WO | WO-2007073203 A1 | 6/2007 |
| WO | WO-2007094558 A1 | 8/2007 |
| WO | WO-2008045311 | 4/2008 |
| WO | WO-2008045312 A1 | 4/2008 |
| WO | WO-2008045362 A2 | 4/2008 |
| WO | WO-2008045363 | 4/2008 |
| WO | WO-2008045364 A2 | 4/2008 |
| WO | WO-2008045462 | 4/2008 |
| WO | WO-2008045463 | 4/2008 |
| WO | WO-2008137299 | 11/2008 |
| WO | WO-2008145096 A1 | 12/2008 |
| WO | WO-2009065069 A1 | 5/2009 |
| WO | WO-2009085706 A2 | 7/2009 |
| WO | WO-2009102672 A2 | 8/2009 |
| WO | WO-2009102731 | 8/2009 |
| WO | WO-2009102733 | 8/2009 |
| WO | WO-2012043396 A1 | 4/2012 |

OTHER PUBLICATIONS

Office Communication from the USPTO for U.S. Appl. No. 11/036,965 dated Mar. 28, 2006.
Amendment in Reply to Office Communication from the USPTO for U.S. Appl. No. 11/036,965 dated Jun. 27, 2006.
Office Communication from the USPTO for U.S. Appl. No. 11/036,965 dated Jan. 30, 2007.
Amendment in Reply to Office Communication from the USPTO for U.S. Appl. No. 11/036,965 dated Jun. 29, 2007.
Notice of Allowance from the USPTO for U.S. Appl. No. 11/036,965 dated Sep. 11, 2007.
Office Communication from the USPTO for U.S. Appl. No. 12/034,499 dated Jul. 9, 2008.
Amendment and Response in U.S. Appl. No. 12/034,499 dated Oct. 8, 2008.
Office Communication from the USPTO for U.S. Appl. No. 12/034,499 dated Jan. 26, 2009.
Amendment and Request for Continued Examination in U.S. Appl. No. 12/034,499 dated Apr. 27, 2009.
Official Communication in U.S. Appl. No. 12/034,499 dated Jul. 16, 2009.
Application Initiated Interview Request in U.S. Appl. No. 12/034,499, dated Oct. 22, 2009.
Examiner Interview Summary in U.S. Appl. No. 12/034,499, dated Oct. 29, 2009.
Amendment and Application Summary of Interview with Examiner in U.S. Appl. No. 12/034,499, dated Dec. 16, 2009.
Office Action in U.S. Appl. No. 12/034,499, dated Apr. 1, 2010.
Examiner Interview Summary in U.S. Appl. No. 12/034,499, dated Jun. 9, 2010.
Request for Continued Examination and Amendment in U.S. Appl. No. 12/034,499, dated Jul. 1, 2010.
Notice of Allowance in U.S. Appl. No. 12/034,499, dated Sep. 3, 2010.
Request for Continued Examination, Preliminary Amendment, and Information Disclosure Statement in U.S. Appl. No. 12/034,499, dated Dec. 1, 2010.
Notice of Allowance in U.S. Appl. No. 12/034,499, dated Jan. 10, 2011.
Request for Continued Examination and Information Disclosure Statement in U.S. Appl. No. 12/034,499, dated Apr. 8, 2011.
Notice of Allowance in U.S. Appl. No. 12/034,499, dated Jun. 2, 2011.
Office Communication from the USPTO for U.S. Appl. No. 12/014,657 dated Aug. 21, 2008.
Amendment and Response in U.S. Appl. No. 12/014,657 dated Nov. 21, 2008.
Office Communication from the USPTO for U.S. Appl. No. 12/014,657 dated Mar. 5, 2009.
Amendment in U.S. Appl. No. 12/014,657 dated Jun. 5, 2009.
Official Communication in U.S. Appl. No. 12/014,657 dated Oct. 15, 2009.
Amendment in U.S. Appl. No. 12/014,657, dated Feb. 16, 2010.
Office Action in U.S. Appl. No. 12/014,657, dated May 28, 2010.
Request for Continued Examination and Amendment in U.S. Appl. No. 12/014,657, dated Aug. 30, 2010.
Notice of Allowance in U.S. Appl. No. 12/014,657, dated Oct. 11, 2011.
Amendment after Notice of Allowance Under Rule 312 in U.S. Appl. No. 12/014,657, dated Nov. 11, 2011.
Response to Amendment Under Rule 312 Communication in U.S. Appl. No. 12/014,657, dated Nov. 29, 2011.
Official Communication in Canadian Application No. 2554980, dated Feb. 8, 2011.
Official Communication in Chinese Application No. 200580003812.0 dated Mar. 7, 2008.
Official Communication in Chinese Application No. 201010140527.6, dated Oct. 12, 2010.
Official Communication in Chinese Application No. 201010140527.6, dated Feb. 21, 2012.
Official Communication in European Application No. 05 712433, dated Mar. 9, 2010.
Official Communication in Indian Application No. 947/MUMNP/2006, dated Oct. 18, 2011.
Official Communication in Japanese Application No. 2006-552191 dated Sep. 8, 2009.
Official Communication in Japanese Application No. 2006-552191, dated Mar. 30, 2010.
Official Communication in Japanese Application No. 2006-552191, dated Oct. 22, 2010.
Official Communication in Korean Patent Application No. 10-2006-7015589, dated Jun. 3, 2011.
Notice of Allowance in Korean Patent Application No. 10-2006-7015589, dated Feb. 23, 2012.
Official Communication in Korean Patent Application No. 10-2010-7002289, dated Jun. 3, 2011.
Notice of Allowance in Korean Patent Application No. 10-2010-7002289, dated Feb. 23, 2012.
Official Communication in Korean Patent Application No. 10-2011-7018192, dated Oct. 13, 2011.
Notice of Allowance in Korean Patent Application No. 10-2011-7018192, dated Feb. 23, 2012.

(56) References Cited

OTHER PUBLICATIONS

Official Communication in Mexican Application No. PA/a/2006/008719 dated Aug. 12, 2008.
International Search Report and Written Opinion in PCT/US2005/002986; (International Publication No. WO 2006/076051) dated Jun. 8, 2005.
International Preliminary Report on Patentability in PCT/US2005/002986; (International Publication No. WO 2006/076051) dated Aug. 17, 2006.
Translation of the Official Communication in Russian Application No. 2006131568/28 dated Feb. 17, 2009.
Official Communication in Taiwanese Application No. 094103300, dated Aug. 16, 2006.
Official Communication in Taiwanese Application No. 094103300, dated Mar. 26, 2010.
Official Communication in Vietnamese Application No. 1-2006-01453, dated Dec. 16, 2009.
European Search Report in European Application No. 12159888 dated Jul. 13, 2012.
Official Communication in Korean Patent Application No. 10-2011-7029841, dated Jul. 23, 2012.
Official Communication in Chinese Application No. 201010140527.6, dated Oct. 26, 2012.
Official Communication in Japanese Application No. 2010-221500, dated Jul. 31, 2012.
Official Communication in Taiwan Application No. 098106746, dated Nov. 28, 2012.
Official Communication in Taiwanese Application No. 098106746, dated Jan. 15, 2013.
Abilieah A, "Optical Tiled AMLCD for Very Large Display Applications," SID International Symposium Digest of Papers, Boston, 1992, 945-949.
"ABS 407 Visible Narrow Band Absorber," downloaded from http://www.exciton.com/pdfs/ABS407.pdf on Feb. 8, 2011.
Akasaka Y., "Three-Dimensional IC Trends," Proceedings of IEEE, 1986, vol. 74 (12), pp. 1703-1714.
Application as Filed in U.S. Appl. No. 13/229,467, dated Sep. 9, 2011.
Application as Filed in U.S. Appl. No. 12/969,224, dated Dec. 15, 2010.
Aratani K, et al., "Process and Design Considerations for Surface Micromachined Beams for a Tuneable Interferometer Array in Silicon," Proc. IEEE Microelectromechanical workshop fort Lauderdale FL, 1993, 230-235.
Aratani K. et al., "Surface Micromachined Tuneable Interferometer Array," Sensors and Actuators A,Elsevier Sequoia S.A., Lausanne, CH, A, 1993, 43(1/3), 17-23.
Austrian Search Report for U.S. Appl. No. 11/040,824 dated Jul. 14, 2005 (Publication No. 2006/077522).
Austrian Search Report for U.S. Appl. No. 11/052,004 dated Jul. 1, 2005 (Publication No. 2006/077509).
Austrian Search Report for U.S. Appl. No. 11/057,392 dated May 12, 2005 (Publication No. 2006/077510).
Austrian Search Report for U.S. Appl. No. 11/064,143 dated Aug. 12, 2005.
Austrian Search Report for U.S. Appl. No. 11/051,258 dated May 13, 2005.
Austrian Search Report for U.S. Appl. No. 11/077,974 dated Jul. 14, 2005.
Austrian Search Report in U.S. Appl. No. 11/041,020 dated May 9, 2005.
Billard C, "Tunable Capacitor," 5th Annual Review of LETI, 2003, 7 Pages.
Brosnihan, et al., "Optical MEMS—A Fabrication Process for MEMS Optical Switches With Integrated On-Chip Electronics," 12th International Conference on Transducers, Solid-State Sensors, Actuators and Microsystems, 2003, vol. 2, pp. 1638-1642.
Cacharelis, et al., "A Reflective-Mode PDLC Light Valve Display Technology," Proceedings of European Solid State Device Research Conference (ESSDERC), 1997, pp. 596-599.
Chemical Properties Handbook, McGraw-Hill, 1999, Refractive Index, Dipole Moment and Radius of Gyration; Inorganic Compounds, No. 151: O2Si.
Conner, "Hybrid Color Display using Optical Interference Filter Array," SID Digest, 1993, 577-580.
Co-pending U.S. Appl. No. 13/494,897, filed Jun. 12, 2012.
Co-pending U.S. Appl. No. 13/494,898, filed Jun. 12, 2012.
Co-pending U.S. Appl. No. 14/057,975, filed Oct. 18, 2013.
Demiryont, et al., "Innovative Transparent Electrode for Flexible Displays," Defense, Security, Cockpit and Future Display II, Proc. of SPIE, Apr. 2006, vol. 6225, pp. 622519-1 to 622519-9.
Dewitt S, "Integrating Touch Screens and Optical Films When Where and How," 3M Touch Systems Society for Information Display, Americas Display Engineering & Applications Conference, Oct. 24-27, 2005, Portland, Oregon U.S.A.
Dokmeci, et al., "Two-Axis Single-Crytal Silicon Micromirror Arrays," Journal of Microelectromechanical Systems, Dec. 2004, 13(6), 1006-1017.
Fan, et al., "Channel Drop Filters in Photonic Crystals," Optics Express, 1998, vol. 3(1), pp. 4-11.
Feenstra, et al., "Electrowetting displays," Liquavista BV, Jan. 2006, 16 pp.
Giles, et al., "A Silicon Mems Optical Switch Attenuator and its Use in Lightwave Subsystems," IEEE Journal of Selected Topics in Quantum Electronics, 1999, 5 (1), 18-25.
"Glass Polarizing and Interference Filters," American Institute of Physics Handbook, 1982, pp. 6-172 to 6-178.
Gokturk, et al., "A Time-Of-Flight Depth Sensor—System Description, Issues and Solutions," 2004 Conference on Computer Vision and Pattern Recognition workshop (CVPRW'04), 2004, 3, 35-42.
Goossen, et al., "Silicon Modulator Based on Mechnically-Active Anti-Reflection Layer With 1Mbit/Sec Capability for Fiber-In-The-Loop Applications," IEEE Photonics Technology Letters, 1994, 1119-1121.
Goossen K.W. et al., "Possible Display Applications of the Silicon Mechanical Antireflection Switch," Society for Information Display, 1994.
Goossen K.W., "MEMS-Based Variable Optical Interference Devices," IEEE/Lens International Conference on Optical Mems, Conference Digest, Piscataway, NJ, USA, IEEE Aug. 21, 2000, pp. 17-18.
Gosch, "West Germany Grabs the Lead in X-Ray Lithography," Electronics, 1987, 78-80.
Hohlfeld, et al., "Micro-Machined Tunable Optical Filters With Optimized Band-Pass Spectrum," 12th International Conference on Transducers, Solid-State Sensors, Actuators and Microsystems, 2003, vol. 2, 1494-1497.
Howard, et al., "Nanometer-Scale Fabrication Techniques," VLSI Electronics: Microstructure Science, 1982, vol. 5, 145-153, 166-173.
Huang, et al., "Multidirectional Asymmetrical Microlens-Array Light Control Films for High Performance Reflective Liquid Crystal Displays," SID Digest, 23002, pp. 870-873.
Imenes, et al., "Spectral Beam Splitting Technology for Increased Conversion Efficiency in Solar Concentrating Systems a Review," Solar Energy Materials, Elsevier Science, Publishers B.V. Amsterdam, NL, Oct. 1, 2004, vol. 84, pp. 19-69, XP002474546.
Jackson, "Classical Electrodynamics," John Wiley & Sons Inc, 1962, pp. 568-573.
Jerman, et al., "A Minature Fabry-Perot Interferometer Fabricated Using Silicon Micromachining Techniques," IEEE Electron Devices Society, 1988.
Jerman et al., "A Miniature Fabry-Perot Interferometer with a Corrugated Silicon Diaphragm Support", IEEE Electron Devices Society, pp. 140-144, 1990.
Jerman, et al., "Miniature Fabry-Perot Interferometers Micromachined in Silicon for use in Optical Fiber WDM Systems," Transducers, Proceedings on the International Conference on Solid State Sensors and Actuators, 1991, vol. ConF. 6, San Francisco, 372-375.
Johnson, "Optical Scanners," Microwave Scanning Antennas, 1964, vol. 1(2), 251-261.

(56) References Cited

OTHER PUBLICATIONS

Kowarz, et al., "Conformal Grating Electromechanical System (Gems) for High-Speed Digital Light Modulation," Proceedings of the IEEE 15th Annual International Conference on Micro Electro Mechanical Systems, MEMS 2002, pp. 568-573.
Lau, "The Characterization of Silicon Dioxide and Silicon Nitride Thin Films, in Infrared Characterization for Microelectronics," World Scientific Publishing Co. Pte. Ltd., New Jersey, 1999, 5, pp. 55-71.
Lezec, "Submicrometer Dimple Array Based Interference Color Field Displays and Sensors," Nano Letters, 2006, 7(2), 329-333.
Light Over Matter Circle No. 36, Jun. 1993.
Lin, et al., "Development of UV Stable LED Encapsulants," Microsystems, Packaging, Assembly and Circuits Technology Conference, IMPACT 2009, 4th, 565-567.
Little, et al., "Vertically Coupled Microring Resonator Channel Dropping Filter," IEEE Photonics Technology Letters, 1999, 11(2), 215-217.
Londergan, et al., "Advanced processes for MEMS-based displays," Proceedings of the Asia Display, 2007, SID, 1, 107-112.
Longhurst R.S., "Geometrical and Physical Optics", Chapter IX: Multiple Beam Interferometry, pp. 153-157,1963.
Maeda, et al., "A Study of a High Quality Front Lighting System for Reflective Full-Color Liquid Crystal Displays," Record of Electrical and Communication, Engineering Conversazione Tohoku University, Sep. 2009, v 78(1), 415-416, ISSN: 0385-7719.
Magel G.A., "Integrated Optic Devices using Micromachined Metal Membranes," SPIE, 1996, vol. 2686, 54-63.
Maier et al., 1996 1 .3" ActiveMatrix liquid crystal spatial light modulator with 508 dpi resolution, SPIE vol. 2754, pp. 171-179.
Mehregany, et al., "MEMS Applications in Optical Systems," IEEE/LEOS 1996 Summer Topical Meetings, 1996, 75-76.
Miles M., et al., "Digital Paper (TM) for reflective displays", Journal of the Society for Information Display, Society for Information Display, vol. 11 (1), pp. 209-215, 2003 ,XP002358929, ISSN: 1071-0922.
Miles M.W., "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284 XP009058455.
Miles M.W., "A New Reflective FPD Technology using Interferometric Modulation," Journal of the SID, 1997, vol. 5(4), 379-382.
Miles M.W., et al., "Interferometric Modulation MEMS as an enabling technology for high-performance reflective displays," Proceedings of the SPIE, 2003, 4985, 131-139.
Nakagawa et al., "Wide-Field-of-View Narrow-Band Spectral Filters Based on Photonic Crystal Nanocavities", Optical Society of America, Optics Letters, vol. 27, No. 3, pp. 191-193, Feb. 1, 2002.
Neal T.D. et al., "Surface Plasmon Enhanced Emission From Dye Doped Polymer Layers," Optics Express Opt. Soc. America, USA, Jul. 11, 2005,vol. 13(14), 5522-5527.
Newsbreaks, "Quantum-trench devices might operated at terahertz frequencies", Laser Focus World, May 1993.

Nieminen, et al., "Design of a Temperature-Stable RF MEMS Capacitor," Institute of Electrical and Electronics Engineers (IEEE) Journal of Microelectromechanical Systems, 2004, vol. 13(5), 705-714.
Obi et al., "Fabrication of Optical Mems in Sol/Gel Materials," IEEE/LEOS International Conference on Optical Mems, 2002, Conference Digest, pp. 39-40.
Oliner, "Radiating Elements and Mutual Coupling," Microwave Scanning Antennas, 1966, vol. 2, 131-157 and pp. 190-194.
Pape, et al., "Characteristics of the Deformable Mirror Device for Optical Information Processing," Optical Engineering, Nov.-Dec. 1983, 22(6), 676-681.
Petschick, et.al., "Fabry-Perot-Interferometer," available at http://pl.physik.tuberlin.de/groups/pg279/protokolless02/04_fpi.pdf, pp. 50-60, May 14, 2002.
Qualcomm MEMS Technologies, Inc., May 2008, Interferometric Modulator (IMOD), Technology Overview, White Paper, 14 pp.
Raley, et al., "A Fabry-Perot Microinterferometer for Visible Wavelengths," IEEE Solid-State Sensor and Actuator Workshop, 1992, 170-173.
Sperger, et al., "High Performance Patterned All-Dielectric Interference Colour Filter for Display Applications," SID Digest, 1994, 81-83.
Stone J.M., "Radiation and Optics, An Introduction to the Classic Theory," 1963, McGraw-Hill, pp. 340-343.
Tai C.Y., et al., "A Transparent Front Lighting System for Reflective-type Displays," SID International Symposium Digest of Technical Papers, Orlando,SID International Symposium Digest of Technical Papers, Santa Ana, SID, vol. 26, 375-378, 1995, (XP000657155).
Tai C.Y. et al., "A Transparent Sheet Display by Plastic MEMS," Journal of the SID, 2006, vol. 14 (8), 735-741.
Taiwan Search Report—TW098106746—TIPO—Nov. 27, 2012.
Taiwan Search Report—TW098106746—TIPO—Jan. 9, 2013.
Tolansky, "Multiple-Beam Interference in Multiple-Beam Interferometry of Surfaces and Films," Chap II Oxford at the Clarendon Press, 1948, pp. 8-11.
Walker, et al., "Electron-Beam-Tunable Interference Filter Spatial Light Modulator," Optics Letters, 1988, vol. 13(5), 345-347.
Wang, et al., "Design and Fabrication of a Novel Two-Dimension MEMS-Based Tunable Capacitor," IEEE International Conference on Communications, Circuits and Systems and West Sino Expositions, 2002, vol. 2, 1766-1769.
Winton et al., "A novel way to capture solar energy," Chemical Week, pp. 17-18 (May 15, 1985).
Wu, et al., "Design of a Reflective Color LCD using Optical Interference Reflectors," Asia Display, Changchun Institute of Physics, 1995, 929-931.
Zhou et al., "Waveguide Panel Display Using Electromechanism Spatial Modulators," SID Digest, 1998, vol. XXIX.
Yan, et al., "Edge-Lighting Light Guide Plate Based on Micro-Prism for Liquid Crystal Display," Journal of Display Technology, vol. 5, No. 9, pp. 355-357, Sep. 2009.
Yu et al., "Design Optimization and Stamper Fabrication of Light Guiding Plates Using Silicon Based Micro-Features," IEEE Symposium on DTIP of MEMS/MOEMS, Rome, Apr. 1-3, 2009.

SPATIAL LIGHT MODULATOR WITH INTEGRATED OPTICAL COMPENSATION STRUCTURE

CROSS-REFERENCE TO RELATED APPLICATIONS

This application is a continuation of U.S. patent application Ser. No. 12/014,657, filed Jan. 15, 2008, issued as U.S. Pat. No. 8,111,445 on Feb. 7, 2012, which is a divisional of U.S. patent application Ser. No. 11/036,965, filed Jan. 14, 2005, issued as U.S. Pat. No. 7,342,705 on Mar. 11, 2008, which claims priority benefit under 35 U.S.C. §119(e) of: U.S. Provisional Patent Application Ser. No. 60/541,607, filed Feb. 3, 2004; U.S. Provisional Patent Application Ser. No. 60/613,482, filed Sep. 27, 2004; U.S. Provisional Patent Application Ser. No. 60/613,536, filed Sep. 27, 2004; and U.S. Provisional Patent Application Ser. No. 60/613,542, filed Sep. 27, 2004. The disclosures of all of the above-referenced prior applications, publications, and patents are considered part of the disclosure of this application, and are incorporated by reference herein in their entirety.

BACKGROUND

1. Field of the Invention

This invention relates to improvements in the manufacturing and performance of spatial light modulators such as interferometric modulators.

2. Description of the Related Art

Spatial light modulators are display devices that contain arrays of individually addressable light modulating elements. Examples of spatial light modulators include liquid crystal displays and interferometric modulator arrays. The light modulating elements in such devices typically function by altering the characteristics of light reflected or transmitted through the individual elements, thus altering the appearance of the display.

SUMMARY

As spatial light modulators become increasingly sophisticated, the inventor anticipates that difficulties associated with fabricating them by current manufacturing process flows will also increase. Accordingly, the inventor has developed spatial light modulators having integrated optical compensation structures and methods for making them.

An embodiment provides a spatial light modulator that includes a substrate; a plurality of individually addressable light-modulating elements arranged over the substrate and configured to modulate light transmitted through the substrate; and an optical compensation structure; wherein the optical compensation structure is arranged between the substrate and the plurality of individually addressable light-modulating elements. In certain embodiments, the optical compensation structure is a passive optical compensation structure.

An embodiment provides a spatial light modulator that includes a substrate; a plurality of individually addressable light-modulating elements arranged over the substrate and configured to modulate light transmitted through the substrate; and an optical compensation structure; wherein the plurality of individually addressable light-modulating elements is arranged between the substrate and the optical compensation structure. In certain embodiments, the optical compensation structure is a passive optical compensation structure.

Another embodiment provides a method of making a spatial light modulator that includes fabricating an optical compensation structure over a transparent substrate; and fabricating a plurality of individually addressable light-modulating elements over the optical compensation structure, the individually addressable light-modulating elements being configured to modulate light transmitted through the transparent substrate. In certain embodiments, fabricating the optical compensation structure includes fabricating a passive optical compensation structure.

Another embodiment provides a method of making a spatial light modulator that includes fabricating a plurality of individually addressable light-modulating elements over a substrate; and fabricating an optical compensation structure over the plurality of individually addressable light-modulating elements, the individually addressable light-modulating elements being configured to modulate light transmitted through the optical compensation structure. In certain embodiments, fabricating the optical compensation structure includes fabricating a passive optical compensation structure.

Another embodiment provides a spatial light modulator that includes a transparent substrate; a plurality of individually addressable interferometric light-modulating elements arranged over the transparent substrate and configured to modulate light transmitted through the transparent substrate, the interferometric light-modulating elements comprising a cavity and a movable wall; and at least one optical compensation structure arranged between the transparent substrate and the plurality of individually addressable interferometric light-modulating elements, the optical compensation structure comprising a black mask, color filter, or diffuser.

Another embodiment provides a spatial light modulator that includes a substrate; a plurality of individually addressable interferometric light-modulating elements arranged over the substrate and configured to modulate light transmitted through or reflected from the substrate, the interferometric light-modulating elements comprising a cavity and a movable wall; and at least one optical compensation structure, the plurality of individually addressable interferometric light-modulating elements being arranged between the substrate and the optical compensation structure, the optical compensation structure comprising a structure selected from the group consisting of an anti-reflective layer, a diffractive optical element, a structure that scatters light, a black mask, a color filter, a diffuser, a microlens array, and a holographic film.

Another embodiment provides a spatial light modulator that includes a substrate; a means for modulating light transmitted through or reflected from the substrate; and a means for compensating the light transmitted through or reflected from the substrate; wherein the means for compensating the light is operatively arranged between the substrate and the means for modulating light transmitted through or reflected from the substrate. In certain embodiments, the means for compensating the light transmitted through or reflected from the substrate is a means for passively compensating the light transmitted through or reflected from the substrate.

Another embodiment provides a spatial light modulator that includes a substrate; a means for modulating light transmitted through or reflected from the substrate; and a means for compensating the light transmitted through or reflected from the substrate;

wherein the means for modulating light transmitted through or reflected from the substrate is operatively arranged between the substrate and the means for compensating the light. In certain embodiments, the means for compensating the light transmitted through or reflected from the substrate is a means for passively compensating the light transmitted through or reflected from the substrate.

Another embodiment provides a spatial light modulator made by a method that includes fabricating an optical compensation structure over a transparent substrate; and fabricating a plurality of individually addressable light-modulating elements over the optical compensation structure, the individually addressable light-modulating elements being configured to modulate light transmitted through the transparent substrate.

Another embodiment provides a spatial light modulator made by a method that includes fabricating a plurality of individually addressable light-modulating elements over a substrate; and fabricating an optical compensation structure over the plurality of individually addressable light-modulating elements, the individually addressable light-modulating elements being configured to modulate light transmitted through the optical compensation structure.

These and other embodiments are described in greater detail below.

BRIEF DESCRIPTION OF THE DRAWINGS

These and other aspects of the invention will be readily apparent from the following description and from the appended drawings, which are meant to illustrate and not to limit the invention, and wherein.

DETAILED DESCRIPTION OF PREFERRED EMBODIMENTS

A preferred embodiment is an interferometric modulator that includes at least one integrated optical compensation structure. In some configurations, the optical compensation structure is arranged between the substrate and the light-modulating elements of the interferometric modulator. In other configurations, the light-modulating elements are arranged between the substrate and the optical compensation structure.

Figure 1A:
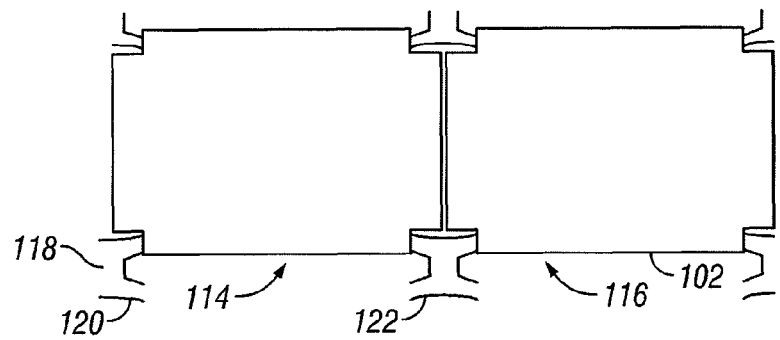
FIGS. 1A and 1B illustrate some characteristics of a typical interferometric modulator (see FIGS. 1A and 1B of U.S. Patent Publication No. 2002/0126364 A1).
Figure 1B:
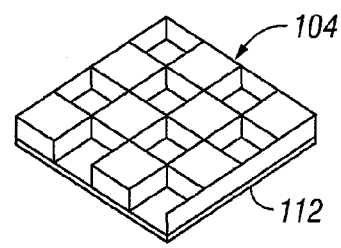
Figure 2:
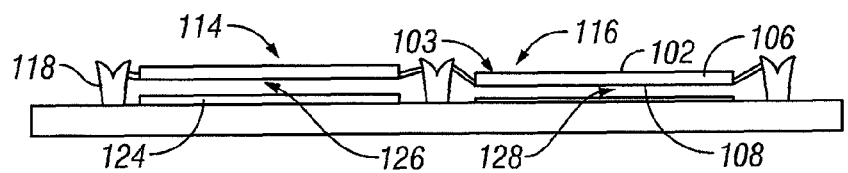
FIG. 2 illustrates some characteristics of a typical interferometric modulator (see FIG. 2 of U.S. Patent Publication No. 2002/0126364 A1).

Various examples of interferometric modulators are described in U.S. Patent Publication No. 2002/0126364 A1. FIGS. 1 and 2 illustrate some characteristics of a typical interferometric modulator (see FIGS. 1 and 2 of U.S. Patent Publication No. 2002/0126364 A1and the corresponding text). Referring to FIGS. 1A and 1B, two interferometric modulator structures 114 and 116 each include a secondary mirror 102 with a corrugated pattern 104 etched into its upper (outer) surface 103, using any of a variety of known techniques. The corrugation does not extend through the membrane 106 on which the mirror is formed so that the inner surface 108 of the mirror remains smooth. FIG. 1B reveals the pattern of etched corrugation 104 on the secondary mirror and the smooth inner surface 112 which remains after etch. The corrugated pattern, which can be formed in a variety of geometries (e.g., rectangular, pyramidal, conical), provides structural stiffening of the mirror, making it more immune to variations in material stresses, reducing total mass, and preventing deformation when the mirror is actuated.

In general, an interferometric modulator which has either no voltage applied or some relatively steady state voltage, or bias voltage, applied is considered to be in a quiescent state and will reflect a particular color, a quiescent color. As referenced in U.S. Patent Publication No. 2002/0126364 A1, the quiescent color is determined by the thickness of the sacrificial spacer upon which the secondary mirror is fabricated.

Each interferometric modulator 114, 116 is rectangular and connected at its four corners to four posts 118 via support arms such as 120 and 122. In some cases (see discussion in U.S. Patent Publication No. 2002/0126364 A1), the interferometric modulator array will be operated at a selected constant bias voltage. In those cases, the secondary mirror 102 will generally maintain a quiescent position which is closer to corresponding primary mirror 128 than without any bias voltage applied. The fabrication of interferometric modulators with differently sized support arms allows for the mechanical restoration force of each interferometric modulator to be determined by its geometry. Thus, with the same bias voltage applied to multiple interferometric modulators, each interferometric modulator may maintain a different biased position (distance from the primary mirror) via control of the dimensions of the support arm and its resulting spring constant. The thicker the support arm is, the greater its spring constant. Thus different colors (e.g., red, green, and blue) can be displayed by different interferometric modulators without requiring deposition of different thickness spacers. Instead, a single spacer, deposited and subsequently removed during fabrication, may be used while color is determined by modifying the support arm dimensions during the single photolithographic step used to define the arms. For example, in FIG. 2, interferometric modulators 114, 116 are both shown in quiescent states with the same bias voltage applied. However, the gap spacing 126 for interferometric modulator 114 is larger than gap spacing 128 for interferometric modulator 116 by virtue of the larger dimensions of its respective support arms. Various other examples of interferometric modulators are also known.

U.S. Patent Publication No. 2002/0126364 A1 also describes various passive optical compensation structures for minimizing color shift as the angle of incidence changes (a characteristic typical of interferometric structures) and active optical compensation structures for supplying supplemental illumination. For example, as illustrated in FIGS. 3A-3F (see FIGS. 6A-6F of U.S. Patent Publication No. 2002/0126364 A1), an optical compensation film may be fabricated on the opposite surface of the substrate from which the array of light modulating elements resides. Such films can be designed and fabricated in a number of ways, and may be used in conjunction with each other.

Figure 3A:
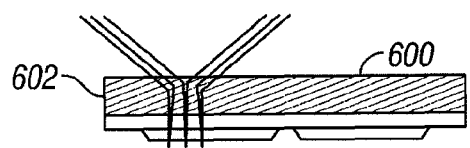
FIGS. 3A-3F illustrate optical compensation films fabricated on the opposite surface of the substrate from which an array of light modulating elements resides (see FIGS. 6A-6F of U.S. Patent Publication No. 2002/0126364 A1).

In FIG. 3A, a passive optical compensation film 600 is a volume or surface relief holographic film. A volume holographic film may be produced by exposing a photosensitive polymer to the interference pattern produced by the intersection of two or more coherent light sources (e.g., lasers). Using the appropriate frequencies and beam orientations arbitrary periodic patterns of refractive indices within the film may be produced. A surface relief holographic film may be produced by creating a metal master using any number of microfabrication techniques known by those skilled in the art. The master is subsequently used to pattern the film. Such films can be used to enhance the transmission and reflection of light within a definable cone of angles, thus minimizing off-axis light. The colors and brightness of a display viewed with on axis light are enhanced and color shift is diminished because brightness goes down significantly outside of the cone.

Figure 3B:
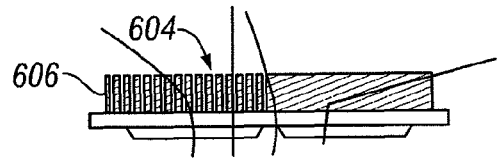

In FIG. 3B, another approach is illustrated for a device 604 in which an array of passive optical compensation structures 606 is fabricated on the substrate. These structures, which can be fabricated using the techniques referenced in U.S. Patent Publication No. 2002/0126364 A1, can be considered photonic crystals, as described in the book "Photonic Crystals", by John D. Joannopoulos, et al. They are essentially three-dimensional interferometric arrays which demonstrate interference from all angles. This provides the ability to design waveguides which can perform a number of functions including channeling incident light of certain frequencies to the appropriately colored pixels, or by changing light of a certain incidence angle to a new incidence angle, or some combination of both.

Figure 3C:

In another example of a passive optical compensation structure, seen in FIG. 3C, a three-layer polymeric film 610 contains suspended particles. The particles are actually single or multi-layer dielectric mirrors which have been fabricated in the form of microscopic plates. These plates, for example, may be fabricated by deposition of multilayer dielectric films onto a polymer sheet which, when dissolved, leaves a film which can "ground up" in a way which produces the plates. The plates are subsequently mixed into a liquid plastic precursor. By the application of electric fields during the curing process, the orientation of these plates may be fixed during manufacture. The mirrors can be designed so that they only reflect at a range of grazing angles. Consequently, light is either reflected or transmitted depending on the incidence angle with respect to the mirror. In FIG. 3C, layer 612 is oriented to reflect light 609 of high incidence that enters the film 610 closer to the perpendicular. Layer 614 reflects light 613 of lower incidence into a more perpendicular path. Layer 616 modifies the even lower angle incident light 615. Because the layers minimally affect light which approaches perpendicularly, they each act as a separate "angle selective incidence filter" with the result that randomly oriented incident light couples into the substrate with a higher degree of perpendicularly. This minimizes the color shift of a display viewed through this film.

Figure 3D:

In another example of a passive optical compensation structure, illustrated in FIG. 3D, micro lenses 622 are used in an array in device 620. Each lens 622 may be used to enhance the fill factor of the display by effectively magnifying the active area of each pixel. This approach may be used by itself or in conjunction with the other color shift compensation films.

Figure 3E:
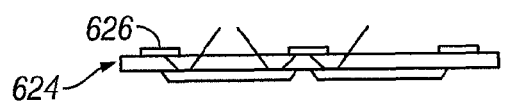
Figure 3F:
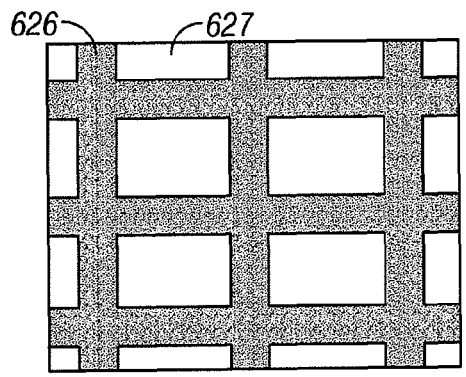

In an example of an active optical compensation structure, illustrated in FIG. 3E, device 624 uses supplemental lighting in the form of a frontlighting array. In this case an organic light emitting material 626, for example, Alq/diamine structures and poly(phenylene vinylene), can be deposited and patterned on the substrate. The top view, FIG. 3F, reveals a pattern 627 which corresponds with the interferometric modulator array underneath. That is, the light emitting areas 626 are designed to obscure the inactive areas between the interferometric modulator, and allow a clear aperture in the remaining regions. Light is actively emitted into the substrate onto the interferometric modulator and is subsequently reflected back to the viewer. Conversely, a patterned emitting film may be applied to the backplate of the display and light transmitted forward through the gaps between the sub-pixels. By patterning a mirror on the front of the display, this light can be reflected back upon the interferometric modulator array. Peripherally mounted light sources in conjunction with films relying on total internal reflection are yet another approach. U.S. Pat. No. 6,055,090 also discloses an interferometric modulator having an active optical compensation structure that includes a supplemental frontlighting source.

Figure 4:
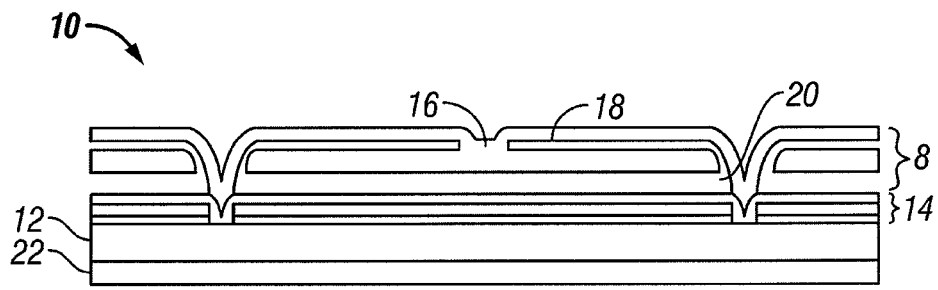
FIG. 4 illustrates an optical compensation film (diffuser) fabricated on the opposite surface of the substrate from which a light modulating element resides.

FIG. 4 illustrates an interferometric modulator 10 comprising a passive optical compensation film (a diffuser 22) fabricated on the opposite surface of the substrate from which a light modulating element resides. The diffuser 22 generally compensates for the specular appearance of an uncompensated spatial light modulator array, e.g., by making the reflective array appear less like a mirror and more like paper. In FIG. 4, a light modulating element 8 comprises a movable wall or element 16, a cavity 20, and a support post 18. As illustrated in FIG. 4, the movable wall 16 is supported over the cavity 20 by the support post 18. An optical stack 14 forms a wall of the cavity 20 opposite to the movable wall 16. The optical stack 14 may be considered part of the light modulating element 8. The optical stack 14 is fabricated on a transparent substrate 12, and the diffuser 22 is fabricated on the opposite side of the substrate 12 from the light modulating element 8. In operation, the movable wall 16 moves through planes parallel to the front wall of the cavity 20. The movable wall 16 is highly reflective and typically comprises a metal. As the movable wall 16 moves toward the optical stack 14 on the opposite side of the cavity 12, self-interference of light (typically entering through the transparent substrate 12 and the optical stack 14) within the cavity 20 occurs. The color of the reflected light that exits the cavity through the transparent substrate 12 and the optical stack 14 may be controlled by varying the distance between the optical stack 14 and the movable wall 16. The surface of the transparent substrate 12 in contact with the optical stack 14 is the surface upon which the light modulating element 8 is fabricated. The diffuser 22 is typically fabricated or attached to the opposite surface of the transparent substrate 12 after fabrication of the light modulating element 8.

As illustrated in FIG. 4 and by the disclosure of U.S. Patent Publication No. 2002/0126364 A1, passive optical compensation structures for spatial light modulators are typically fabricated on the opposite surface of the substrate from which the array of light modulating elements resides to facilitate existing manufacturing process flows.

Manufacturing of the overall display system typically involves producing the various components separately, such as the passive optical compensation structures, the interferometric modulator structures, the driver electronics, the graphics control functions, etc., and then integrating them at a later stage in the manufacturing process flow. Producing the various components separately and then integrating them at a later stage simplifies the delicate task of manufacturing the light modulating elements by reducing the need for complex deposition and micro-fabrication schemes.

As spatial light modulators become increasingly sophisticated, it is anticipated that difficulties associated with fabricating them by current manufacturing process flows will also increase. Accordingly, spatial light modulators having integrated optical compensation structures and methods for making them have been developed. An embodiment provides spatial light modulators having an integrated optical compensation structure, e.g., an optical compensation structure located between the substrate and the light-modulating elements, or an optical compensation structure located on the opposite side of the light-modulating elements from the substrate. The optical compensation structure may be active or passive, as desired. In this context, a "passive" optical compensation structure is one that does not supply a supplemental frontlighting source.

As discussed above, FIG. 4 illustrates a passive optical compensation film (a diffuser 22) fabricated on the opposite surface of the substrate from which a light modulating element resides. In FIG. 4, the light modulating element 8 is an interferometric modulator comprising the movable wall or element 16, the cavity 12, the support post 18. The optical stack 14 is fabricated on the transparent substrate 12, and the diffuser 22 is fabricated on the opposite side of the substrate 12 from the light modulating element 8. The optical stack 14 may be considered part of the light modulating element 8. Those skilled in the art appreciate that, in some embodiments, an interferometric modulator may modulate between a black, or absorbing state, and a reflecting state. The reflecting state is a non-interference based state that appears to be white. While the white state in these embodiments does not particularly depend on the interference characteristics of the modulator, the modulating elements preferably have a structure that is similar to those embodiments of interferometric modulators that rely upon the interference characteristics and will be referred to as such herein. Interferometric modulators may modulate between an absorbing state and an interference state, between an absorbing state and a reflective state, between a reflective state and an interference state, or between two different interference states.

Figure 5A:
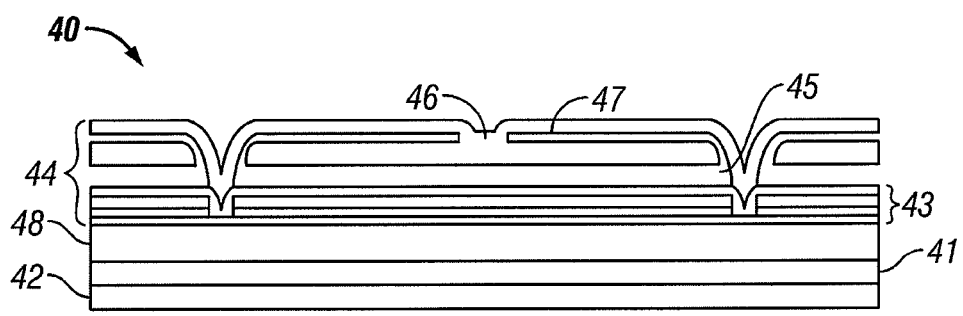
FIGS. 5A to 5C illustrate various embodiments of spatial light modulators comprising integrated optical compensation structures.

FIG. 5A illustrates an embodiment of a spatial light modulator 40 in which a passive optical compensation structure (diffuser 41) is arranged between a substrate 42 and a light-modulating element 44, rather than being on the opposite side of the substrate from the light modulating element as shown in FIG. 4. In the embodiment illustrated in FIG. 5A, the light-modulating element 44 is an interferometric modulator comprising a cavity 45, a movable wall 46, an optical stack 43, and a support 47. The optical stack 43 is on the wall of the cavity 45 that is opposite to the movable wall 46. In the illustrated embodiment, the spatial light modulator 40 further comprises a planarization layer 48 between the substrate 42 and the optical stack 43. Both the movable wall 46 and the optical stack 43 are reflective, so that operation of spatial light modulator 40 is generally similar to that described for the spatial light modulator 10 illustrated in FIG. 4. Typically, the substrate 42 is at least partially transparent. Those skilled in the art will appreciate that the light-modulating element 44 may be configured in an array comprising a plurality of individually addressable light-modulating elements arranged over a transparent substrate and configured to modulate light transmitted through the transparent substrate.

Those skilled in the art will also appreciate that the diffuser 41 illustrated in FIG. 5A is representative of various optical compensation structures (both active and passive) that may be arranged between the substrate and the plurality of individually addressable light-modulating elements. For example, an active optical compensation structure may supply a supplemental frontlighting source. Non-limiting examples of passive optical compensation structures include an anti-reflective layer, a diffractive optical element, a structure that scatters light, a black mask, a color filter, a microlens array, a holographic film (e.g., that mitigates a shift in reflected color with respect to an angle of incidence of the light transmitted through the transparent substrate), or a combination thereof. In FIG. 5, the light-modulating element 44 comprises an interferometric modulator, but other spatial light modulators may also be used.

Figure 5B:
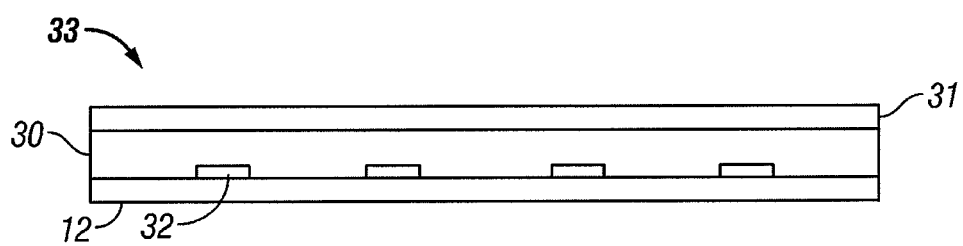

FIG. 5B illustrates an embodiment of a spatial light modulator 33 in which a passive optical compensation structure (black mask 32) is arranged between a transparent substrate 12 and a reflecting element 31. The reflecting element may be an optical stack. Black masks such as the black mask 32 may be used to mask parts of the spatial light modulator structure that are not desirable for the viewer to see. A light modulating element or elements (e.g., a plurality of individually addressable light-modulating elements) are omitted from FIG. 5B for clarity, but are understood to be arranged over the transparent substrate 12 and configured to modulate light transmitted through the transparent substrate 12. For example, the light modulating element of FIG. 5B may comprise a plurality of individually addressable light-modulating elements arranged over the reflecting element 31 as discussed above with respect to FIG. 5A. The spatial light modulator 33 may include a planarization layer 30, e.g., between the black mask 32 and the reflecting element 31 as shown in FIG. 5B.

Figure 5C:
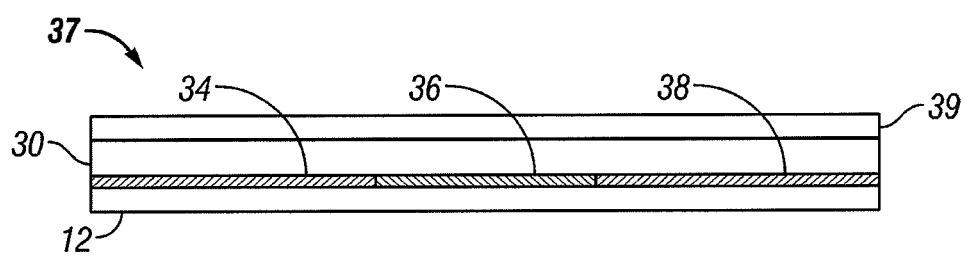

FIG. 5C illustrates an embodiment of a spatial light modulator 37 in which a passive optical compensation structure (comprising color filter elements 34, 36, 38) is arranged between a transparent substrate 12 and a reflecting element 39. As in FIG. 5B, the reflecting element 39 may be an optical stack. In the illustrated embodiment, the color filter elements 34, 36, 38 are red, green and blue, respectively, but other colors may be selected by those skilled in the art so that the resulting spatial light modulator produces the desired colors. As in FIG. 5B, a light modulating element or elements (e.g., a plurality of individually addressable light-modulating elements) are omitted from FIG. 5C for clarity, but are understood to be arranged over the transparent substrate 12 and configured to modulate light transmitted through the transparent substrate 12. For example, the light modulating element of FIG. 5C may comprise a plurality of individually addressable light-modulating elements arranged over the optical stack as discussed above with respect to FIG. 5A. The spatial light modulator 37 may include a planarization layer 30, e.g., between the color filter elements 34, 36, 38 and the optical stack 39 as shown in FIG. 5C.

The use of a color filter may increase the performance of the spatial light modulator by enhancing color saturation. Also, interferometric modulators that produce only black and white may be used in combination with color filters to produce colored light.

Interferometric modulators may be fabricated to produce various colors by varying the size of the cavity. However, varying the size of the cavity may involve varying the manufacturing process, e.g., by manufacturing a different size cavity for an interferometric modulator that produces green light than for an interferometric modulator that produces red light. The use of black and white interferometric modulators in combination with color filters may substantially simplify the manufacturing process. Other improvements in the manufacturing process are realized by integrating the color filter into the interferometric modulator as illustrated in FIG. 5C.

Figure 6:
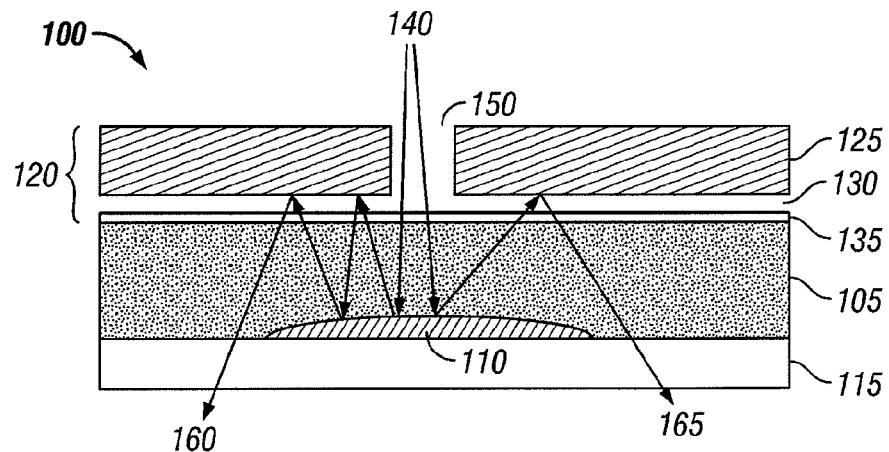
FIG. 6 illustrates an embodiment of a spatial light modulator comprising an integrated optical compensation structure that scatters light.

FIG. 6 illustrates an embodiment of a spatial light modulator 100 in which a passive optical compensation structure 105 (a planarization layer comprising a scattering element 110) is arranged between a transparent substrate 115 and a light-modulating element 120. In the embodiment illustrated in FIG. 6, the light-modulating element 120 is an interferometric modulator comprising a cavity 130, a movable wall 125, and an optical stack 135. The optical stack 135 is on the wall of the cavity 130 that is opposite to the movable wall 125. Both the movable wall 125 and the optical stack 135 are reflective (the optical stack 135 is partially reflective), so that operation of spatial light modulator 100 is generally similar to that described for the spatial light modulator 10 illustrated in FIG. 4. Light 140 passes through a slot 150 in the movable wall 125 and reflects from the scattering element 110 such that it scatters the light 140 back to the movable wall 125 (and in some cases back again to the scattering element 110), ultimately passing through the transparent substrate 115 and exiting 160, 165 as shown in FIG. 6. Preferably, the scattering element 110 is shaped such that the light 140 is scattered randomly. For clarity, a single scattering element 110 and a single slot 150 are illustrated in FIG. 6, but it will be understood that the spatial light modulator 100 may comprise a plurality of scattering elements and slots, arranged to provide the desired amount of scattered light.

Figure 7A:
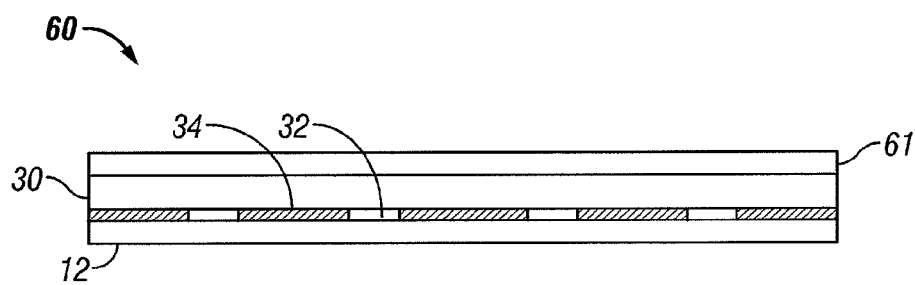
FIGS. 7A and 7B illustrate various embodiments of spatial light modulators comprising integrated optical compensation structures.
Figure 7B:
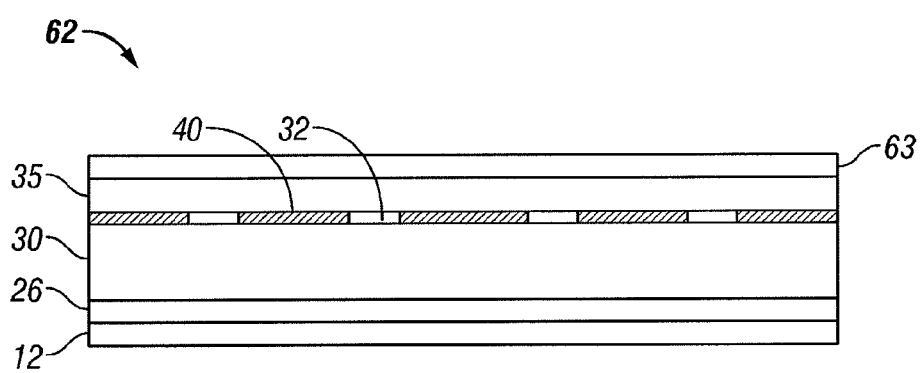

FIGS. 7A and 7B illustrate embodiments of spatial light modulators comprising different combinations of integrated optical compensation structures. FIG. 7A illustrates an embodiment of a spatial light modulator 60 in which a passive optical compensation structure (comprising a color filter element 34 and a black mask 32) is arranged between a transparent substrate 12 and an optical stack 61. FIG. 7B illustrates an embodiment of a spatial light modulator 62 in which a first passive optical compensation structure (comprising a color filter element 40 and a black mask 32) and a second passive optical compensation structure (comprising diffuser 26) are arranged between a transparent substrate 12 and an optical stack 63. As in FIGS. 5B and 5C, a light modulating element or elements (e.g., a plurality of individually addressable light-modulating elements) are omitted from FIGS. 7A and 7B for clarity, but are understood to be arranged over the transparent substrate 12 and configured to modulate light transmitted through the transparent substrate. The spatial light modulators 60, 62 may include a planarization layer 30 e.g., between the passive optical compensation structure (comprising the color filter element 34 and the black mask 32) and the optical stack 61 as shown in FIG. 7A, or between the first and second passive optical compensation structures as shown in FIG. 7B. The spatial light modulator may include an additional planarization layer, e.g., a planarization layer 35 as shown in FIG. 7B between the first passive optical compensation structure (comprising a color filter element 40 and a black mask 32) and the optical stack 63.

Spatial light modulators may comprise an optical compensation structure that performs one or more functions (e.g., a color filter and a black mask as illustrated in FIG. 7A), and/or the optical compensation structure may comprise multiple layers, optionally separated from each other by planarization layers (e.g., as illustrated in FIG. 7B). Those skilled in the art will understand that the term "optical compensation structure" may be used to refer to a structure having a particular function (e.g., the diffuser 26), a layer having multiple functions (e.g., comprising the color filter element 34 and the black mask 32), or multiple layers each having one or more functions as illustrated in FIG. 7B, optionally including planarization layer(s). Thus, spatial light modulators may comprise any combination of active and/or passive optical compensation structures, e.g., a black mask and a color filter; a black mask and a diffuser; a color filter and a diffuser; a black mask, color filter and a diffuser, etc. Means for compensating the light transmitted through the transparent substrate include optical compensation structures as described herein.

Figure 8:
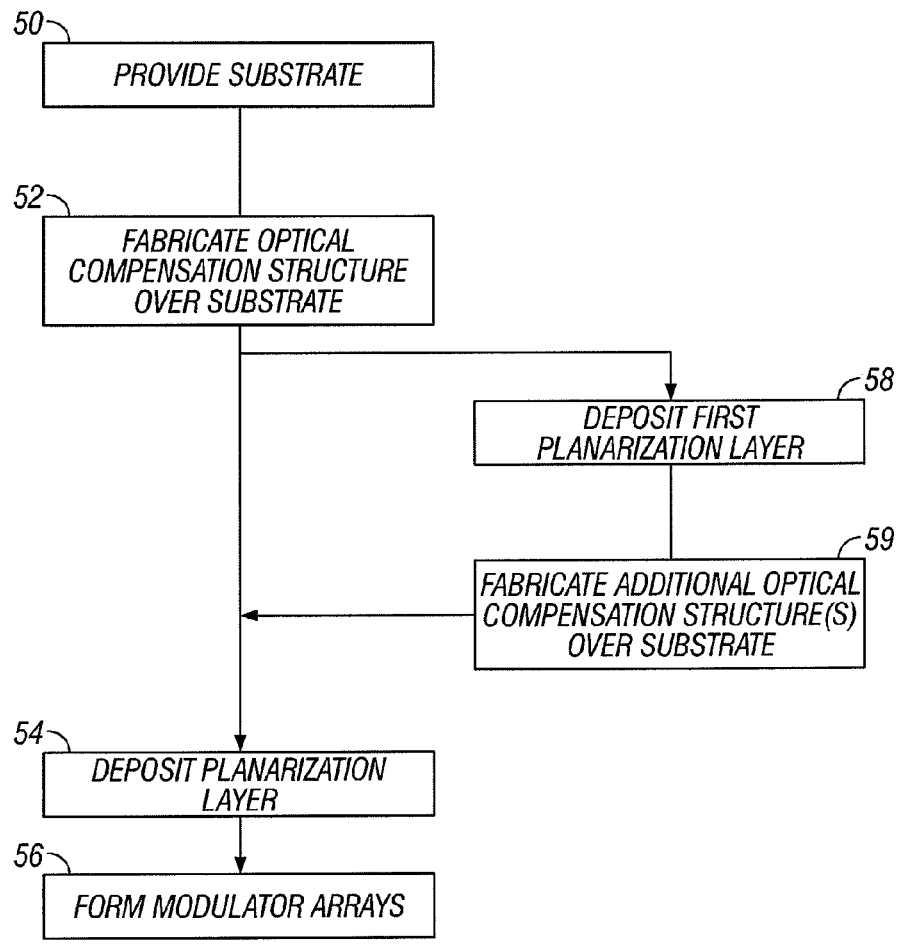
FIG. 8 illustrates an embodiment of a manufacturing process flow diagram for making spatial light modulators comprising integrated optical compensation structures.

Spatial light modulators comprising an optical compensation structure may be fabricated by integrating the fabrication of the optical compensation structure into the process for fabricating the spatial light modulator. An example of such a process is illustrated in FIG. 8. The process begins with the substrate being provided at step 50. Typically, the substrate is glass, plastic or other transparent substrate. Those skilled in the art will appreciate that the term "transparent" as used herein encompasses materials that are substantially transparent to the operational wavelength(s) of the spatial light modulator, and thus transparent substrates need not transmit all wavelengths of light and may absorb a portion of the light at the operational wavelength(s) of the spatial light modulator. For example, the transparent substrate may be tinted and/or polarized if desired for a particular application. Thus, the transparency and reflectivity of the substrate may be varied, depending on the configuration and the function desired. In some embodiments, the substrate is at least partially transparent and may be substantially transparent. In other embodiments, the substrate is at least partially reflective and may be substantially reflective. It is understood that a substrate may be both partially transparent and partially reflective.

The process illustrated in FIG. 8 continues at step 52 with the fabrication of the optical compensation structure. Depending on the structure, the materials and methods used for its fabrication may vary. For example, it is often convenient to fabricate the optical compensation structures using techniques and methods compatible with the manufacturing of the individually addressable light-modulating elements, e.g., by spin coating and/or chemical vapor deposition techniques. For example, a diffuser film may be fabricated by spin-coating the substrate using a polymer or polymer solution that contains scattering elements dispersed therein. For example, the polymer may be a polyimide and the scattering elements may be microscopic glass beads. Color filters and black masks may be appropriately dyed photoresist polymers fabricated on the substrate using known photoresist deposition and masking techniques. Black masks may also be inorganic materials such as chrome oxide, also known as black chrome, fabricated on the substrate using known deposition and masking techniques.

The process illustrated in FIG. 8 continues at step 54 with the deposition of a planarization layer. The planarization layer or layers are typically polymers, e.g., polyimide, and may be deposited using known deposition and masking techniques. The deposition of a planarization layer is an optional, but is often preferred because it results in a suitable substrate for subsequent processing steps. The process illustrated in FIG. 8 continues at step 56 with the fabrication of individually addressable light-modulating elements (e.g., interferometric modulator elements) over the optical compensation structure and, if present, the planarization layer. Interferometric modulators are generally fabricated using thin film deposition processes, e.g., as described in U.S. Pat. Nos. 5,835,255 and 6,055,090, and in U.S. Patent Publication No. 2002/0126364 A1. A variation of this process, also illustrated in FIG. 8, involves the fabrication of an additional planarization layer at step 58, followed by the fabrication of an additional optical compensation structure at step 59. After fabrication at step 59, the fabrication process may return to steps 58, 59 for the fabrication of additional planarization layer(s) and optical compensation structure(s), or may proceed to steps 54, 56 for the fabrication of the planarization layer and individually addressable light-modulating elements. Those skilled in the art will understand that the process illustrated in FIG. 8 or variations thereof may be used to fabricate the spatial light modulators described herein, including without limitation the spatial light modulators illustrated in FIGS. 5-7. Means for modulating light transmitted through the transparent substrate include interferometric modulators and liquid crystal displays.

Figure 9:
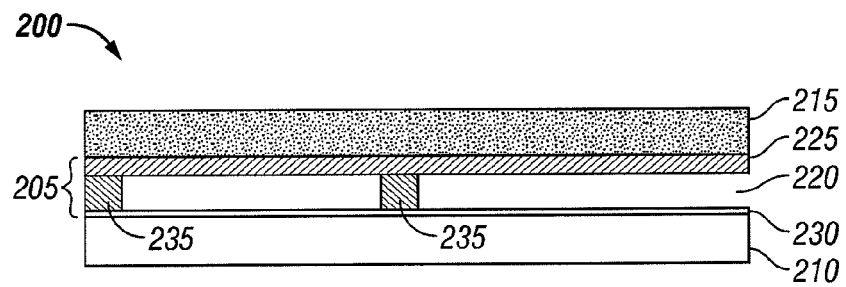
FIG. 9 illustrates an embodiment of a spatial light modulator comprising an integrated optical compensation structure.

FIG. 9 illustrates an embodiment of a spatial light modulator 200 in which a light modulating element 205 is arranged between a substrate 210 and an optical compensation structure 215. In the embodiment illustrated in FIG. 9, the light-modulating element 205 is an interferometric modulator comprising a cavity 220, a movable wall 225, an optical stack 230, and supports 235. The optical stack 230 is on the wall of the cavity 220 that is opposite to the movable wall 225. The optical compensation structure 215 may be any of the optical compensation structures described herein, e.g., an active optical compensation structure that supplies a supplemental frontlighting source, and/or a passive optical compensation structure, e.g., an anti-reflective layer, a diffractive optical element, a structure that scatters light, a black mask, a color filter, a diffuser, a microlens array, a holographic film that mitigates a shift in reflected color with respect to an angle of incidence of the light transmitted through the substrate, or a combination thereof. In FIG. 9, the light-modulating element 205 comprises an interferometric modulator, but other spatial light modulators may also be used.

A spatial light modulator in which a light modulating element is arranged between a substrate and an optical compensation structure (such as that illustrated in FIG. 9) may be fabricated by a process similar to that illustrated in FIG. 8, except that the individually addressable light-modulating elements are fabricated over the substrate, followed by fabrication of the optical compensation structure(s) over the individually addressable light-modulating elements (e.g., step 56 in FIG. 8 is conducted after step 50 and prior to step 52). Optionally, a planarization layer may be fabricated over the individually addressable light-modulating elements, followed by fabrication of the optical compensation structure(s) over the planarization layer.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A spatial light modulator, comprising:
    a substrate;
    a plurality of individually addressable interferometric light-modulating elements configured to modulate light transmitted through the substrate, the interferometric light-modulating elements including a movable reflective layer; and
    a plurality of optical compensation structures between the substrate and the plurality of individually addressable interferometric light-modulating elements, at least one of the optical compensation structures including a diffuser.

2. The spatial light modulator of claim 1, wherein at least one of the optical compensation structures includes a black mask.

3. The spatial light modulator of claim 1, wherein at least one of the optical compensation structures includes a color filter.

4. The spatial light modulator of claim 1, wherein at least one of the optical compensation structures includes an anti-reflective layer.

5. The spatial light modulator of claim 1, wherein at least one of the optical compensation structures includes a plurality of scattering elements.

6. The spatial light modulator of claim 1, wherein at least one of the optical compensation structures includes a microlens array.

7. The spatial light modulator of claim 1, wherein at least one of the optical compensation structures includes a holographic film.

8. The spatial light modulator of claim 1, wherein at least one of the optical compensation structures includes a diffractive optical element.

9. The spatial light modulator of claim 1, wherein at least one of the optical compensation structures includes a planarization layer that includes a scattering element.

10. The spatial light modulator of claim 1, wherein at least one of the optical compensation structures includes a passive optical compensation structure.

11. The spatial light modulator of claim 1, further comprising a planarization layer.

12. The spatial light modulator of claim 1, wherein the substrate is partially transparent.

13. The spatial light modulator of claim 1, wherein at least one of the optical compensation structures is between the diffuser and the plurality of individually addressable interferometric light-modulating elements.

14. The spatial light modulator of claim 1, wherein the diffuser is between at least one of the optical compensation structures and the plurality of individually addressable interferometric light-modulating elements.

15. The spatial light modulator of claim 1, further comprising driver electronics.

16. A spatial light modulator, comprising:
    a substrate;
    a means for interferometrically modulating light transmitted through;
    a plurality of means for compensating the light transmitted through the substrate, the plurality of light compensating means between the substrate and the light modulating means, at least one of the light compensating means including a diffuser.

17. The spatial light modulator of claim 16, wherein the light modulating means includes a plurality of interferometric modulators.

18. The spatial light modulator of claim 17, wherein each of the plurality of interferometric modulators includes a movable reflective layer.

19. The spatial light modulator of claim 16, wherein the plurality of light compensating means includes at least one of a black mask, a color filter, an anti-reflective layer, a plurality of scattering elements, a microlens array, a holographic film, a diffractive optical element, and a planarization layer that includes a scattering element.

20. The spatial light modulator of claim 16, wherein at least one of the light compensating means includes a passive optical compensation structure.

21. The spatial light modulator of claim 16, wherein the substrate is partially transparent.

22. The spatial light modulator of claim 16, further comprising a planarization layer.

* * * * *